United States Patent [19]

Kawamoto et al.

[11] Patent Number: 6,120,197
[45] Date of Patent: Sep. 19, 2000

[54] PRINTER COLOR PROCESSING MODE AUTOMATIC CONTROL APPARATUS, METHOD, RECEIVING APPARATUS, SYSTEM, AND ITS STORING MEDIUM

[75] Inventors: Hirokazu Kawamoto, Tokyo; Koji Nakagiri; Satoshi Nishikawa, both of Kawasaki; Yasuo Mori; Yasuhiro Kujirai, both of Tokyo, all of Japan

[73] Assignee: Canon Kabushiki Kaisha, Tokyo, Japan

[21] Appl. No.: 09/018,795

[22] Filed: Feb. 4, 1998

[30] Foreign Application Priority Data

Feb. 7, 1997 [JP] Japan .................................. 9-025175
Oct. 20, 1997 [JP] Japan .................................. 9-286969

[51] Int. Cl.[7] .................................................... B41J 5/30
[52] U.S. Cl. .............................. 400/61; 400/76; 400/70
[58] Field of Search ............................ 101/171; 395/112; 400/61, 76, 70

[56] References Cited

U.S. PATENT DOCUMENTS

| 5,522,657 | 6/1996 | Jamzadeh et al. | 358/302 |
| 5,604,598 | 2/1997 | Shigemura | 358/296 |
| 5,778,276 | 7/1998 | Hasagawa | 399/17 |
| 5,845,076 | 12/1998 | Arakawa | 395/200.33 |

FOREIGN PATENT DOCUMENTS 0660583  6/1995  European Pat. Off.  ....... H04N 1/333

*Primary Examiner*—John S. Hilten
*Assistant Examiner*—Charles H. Wolan, Jr.
*Attorney, Agent, or Firm*—Fitzpatrick, Cella, Harper & Scinto

[57] ABSTRACT

A printing apparatus which can improve a print throughput in consideration of a color processing mode suitable for print data is provided. The color processing mode is decided on the basis of information of color attribute included in the print data and added to output data, the resultant data is transferred to the printing apparatus, and further, the color processing mode is decided by a page unit.

98 Claims, 19 Drawing Sheets

FIG. 6

```
FILE HEAD →
[ JOB START  ] . . . . . . . . . . . . . . . . . . . . . . . . . . . .
[ CHR PRINT ] . . . . . . . . . [ CHR PRINT ] . . [ CHR PRINT ] . .
. . . . . . . . . . . . . . . . . [ NEW PAGE ] . . . . . [ IMAGE DRAW ] . . .
. . . [RECTANGLE DRAW] . . . [RECTANGLE DRAW] . . [RECTANGLE DRAW] .
[ CHR PRINT ] . . . . . . FF [ CHR PRINT ] . . . . . . . . [RECTANGLE DRAW] . .
[ CHR PRINT ] [ CHR PRINT ] . [ CHR PRINT ] [ CHR PRINT ] FF [ CHR PRINT ] . .
[ CHR PRINT ] [ CHR PRINT ] FF [ CHR PRINT ] [ CHR PRINT ] . . . . . . . . . .
[ CHR PRINT ] [ CHR PRINT ] [ CHR PRINT ] [ CHR PRINT ] . . . . [ JOB END ]
```
← FILE END

FIG. 8

| PAGE | COLOR |
|---|---|
| 1 | FULL COLOR |
| 2 | FULL COLOR |
| 3 | BLACK & WHITE |
| 4 | BLACK & WHITE |
| 5 | BLACK & WHITE |

FIG. 9

◇COLOR PROCESSING MODE DESIGNATION COMMAND

< ESC > [x" p

X : COLOR PROCESSING MODE DESIGNATION

= 1  BLACK-AND-WHITE MODE

= 0  FULL COLOR MODE

FIG. 16

|  | DOUBLE-SIDED PRINTING UNIT | DELIVERY TRAY |
|---|---|---|
| STEP 1 PRINTING OF PAGE 4 | REVERSE SIDE OF PAGE 4 | |
| STEP 2 PRINTING OF PAGE 2 | REVERSE SIDE OF PAGE 2 REVERSE SIDE OF PAGE 4 | |
| STEP 3 PRINTING OF PAGE 1 | REVERSE SIDE OF PAGE 4 | REVERSE SIDE OF PAGE 2 RIGHT SIDE OF PAGE 1 |
| STEP 4 PRINTING OF PAGE 3 | | REVERSE SIDE OF PAGE 4 RIGHT SIDE OF PAGE 3 REVERSE SIDE OF PAGE 2 RIGHT SIDE OF PAGE 1 |

FIG. 17

|  | FULL COLOR | BLACK & WHITE |
|---|---|---|
| PRINTING TIME FOR 1ST PAGE (SEC.) | 30 | 10 |
| PRINTING TIME FOR SUCCESIVE PAGE (SEC.) | 10 | 2.5 |
| DELIVERY WAITING TIME UPON MODE SWITCHING (SEC.) | BLACK & WHITE TO FULL COLOR 2.5 | FULL COLOR TO BLACK & WHITE 10 |

| FIG. 22A | FIG. 22B |

FIG. 24

| |
|---|
| JOB-IDENTIFIABLE ID |
| NO. OF PHYSICAL PAGE |
| NO. OF LOGICAL PAGES ASSIGNED TO THE PHYSICAL PAGE |
| NO. OF 1ST LOGICAL PAGE |
| ⋮ |
| NO. OF n-TH LOGICAL PAGE |
| COLOR PROCESSING MODE FOR THIS PHYSICAL PAGE |

PRINTER COLOR PROCESSING MODE AUTOMATIC CONTROL APPARATUS, METHOD, RECEIVING APPARATUS, SYSTEM, AND ITS STORING MEDIUM

BACKGROUND OF THE INVENTION

1. Field of the Invention

The invention relates to control method and apparatus for automatically discriminating a printer color processing mode. More particularly, the invention relates to printer color processing mode automatic control method, information processing apparatus, output control apparatus, and program storing medium in a system comprising an information processing apparatus such as a personal computer or the like and an output control apparatus such as a printer or the like.

2. Related Background Art

In a printing by a conventional output control apparatus, for example, a laser printer, even in the case where the printer has a plurality of color processing modes such as full color printing mode and a black and white printing mode, as for the selection of a color processing mode which is used at the time of printing, the mode selected by the user is merely used and the printing operation is executed without considering a print throughput in the printer, the color processing mode suitable for print data, and the like.

On the other hand, even in the case where only one page includes full color data and the other pages are constructed by only black and white data, the user cannot help selecting the full color printing mode and the print throughput deteriorates.

As mentioned above, in the printing in the printer as a conventional output control apparatus, even in the case where the printer has a plurality of color processing modes such as full color printing mode and black and white printing mode, as for the selection of the color processing mode which is used at the time of printing, the mode selected by the user is merely used. There is a problem such that the printing operation is executed without considering the print throughput in the printer, the color processing mode suitable for the print data, and the like.

Even in the case where only one page includes full color data and the other pages are constructed by black and white data, if the full color printing mode is selected, there is a problem such that the print throughput deteriorates.

When the color processing mode is discriminated, there is a problem such that a time required to open from a printing process of an application at the time of printing is slow.

When intermediate code is used in order to rapidly open the application, there is also a problem such that a time which is required for a first print-out is slow.

SUMMARY OF THE INVENTION

The invention is made in consideration of the foregoing conventional techniques and it is an object of the invention to provide a printing system which can execute the printing in consideration of a color processing mode suitable for print data.

Another object of the invention is to provide a printing system which can rapidly open from a printing process of an application at the time of printing when a color processing mode is discriminated.

To accomplish the above objects, according to one aspect of the invention, there is provided printer color processing mode automatic control method and apparatus, comprising: color attribute storing means for storing a color attribute of print data; color processing mode deciding means for deciding a color processing mode of the print data on the basis of control information included in the print data; and transfer means for designating the color processing mode of the print data decided by the color processing mode deciding means and transferring output data generated on the basis of the print data to a printing apparatus.

According to another aspect, the color processing mode is determined by a page unit of the print data and the transfer means has means for designating, by the page unit, the color processing mode of the print data decided by the color processing mode and transmitting to the printing apparatus.

According to still another aspect, the apparatus has means constructed in a manner such that when print data to be transmitted to the printing apparatus is generated from data of an intermediate code format which was temporarily saved, the color printing mode of a page of each print data which was decided by the color processing mode deciding means is designated, and output data to be transmitted to the printing apparatus is generated and transferred to the printing apparatus.

According to further another aspect, the apparatus has page synthesizing means for reducing a plurality of pages of the print data and laying out into one page, and the color processing mode deciding means has means for determining the color processing mode in which the page synthesized by the page synthesizing means is correctly color reproduced on the basis of information of the color processing mode of each page which is laid out to a plurality of pages stored in the color attribute storing means.

According to further another aspect, the apparatus has means for selecting, at each page, a mode to guarantee color reproducibility in all of the pages on the basis of the color processing mode and determining the color processing mode so that a time from the start of the printing to the end thereof becomes the shortest.

According to further another aspect, the apparatus has means for deciding the color processing mode at a time point when intermediate files as many as the number of pages of the print data of the minimum unit at which the color processing modes in the printing apparatus can be switched.

According to further another aspect, the apparatus has means constructed in a manner such that if the color processing mode is decided by the page unit of the print data, the color processing mode of the print data which was determined by the color processing mode is immediately designated by the page unit, and the output data to be transmitted to the printing apparatus is generated and can be transferred to the printing apparatus.

Other features and advantages of the present invention will be apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of contents in an intermediate code data temporary storing file which is generated by the printer color processing mode automatic control program;

FIG. 8 shows an example of color processing mode information of every page which is generated by the printer color processing mode automatic control program;

FIG. 9 shows an example of a color processing mode designation command;

FIG. 16 is a diagram showing a paper conveying situation when the double-sided print is performed;

FIG. 17 is a table showing a printing time in each color processing mode of a printer and a delivery waiting time upon switching of the color processing mode;

FIG. 24 is a diagram showing an example of a data format which is sent when a print request of a physical page is performed from the spool file manager to the despooler.

DETAILED DESCRIPTION OF THE PREFERRED EMBODIMENTS

[First embodiment]

Figure 1:
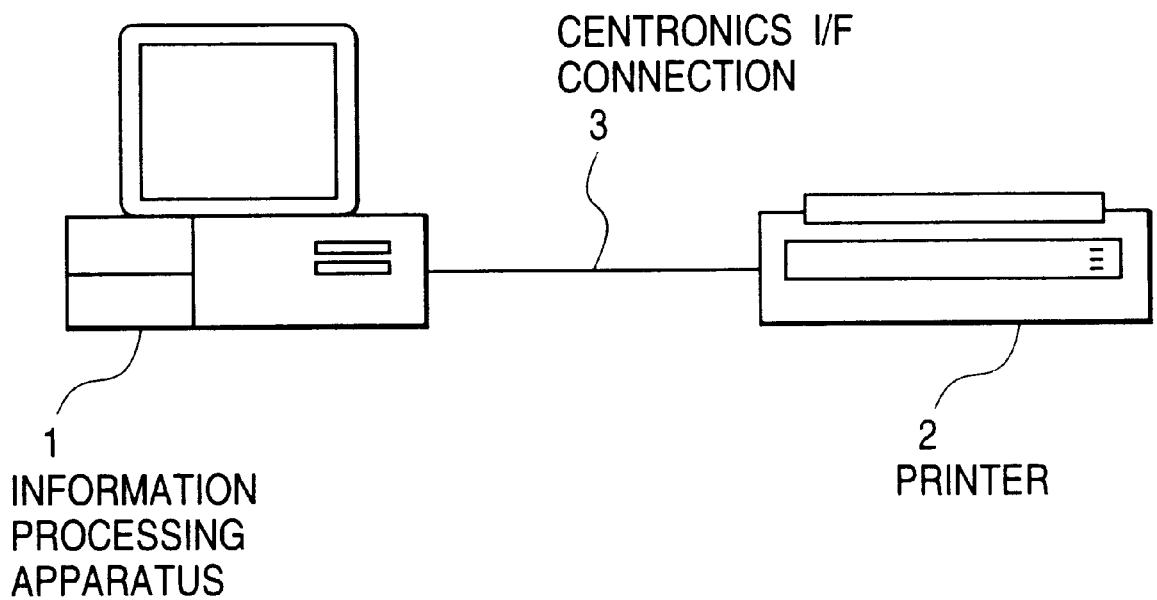
FIG. 1 is a block diagram showing a system according to an embodiment of the invention.

Embodiments of the invention will now be described hereinbelow with reference to the drawings. FIG. 1 is a block diagram for explaining a construction of a printer color processing mode automatic control system showing an embodiment of the invention. As shown in FIG. 1, an information processing apparatus 1 and a printer 2 are connected by a centronics I/F connection 3. A case where the information processing apparatus and the printer are connected in a one-to-one corresponding relation is considered here for simplicity of explanation. However, so long as the functions of the invention are executed, the invention can be applied to any one of a single apparatus, a system comprising a plurality of apparatuses, and a system which is connected through a network such as LAN, WAN, or the like and processes are executed. The scope of claims of the invention incorporates them.

Figure 2:
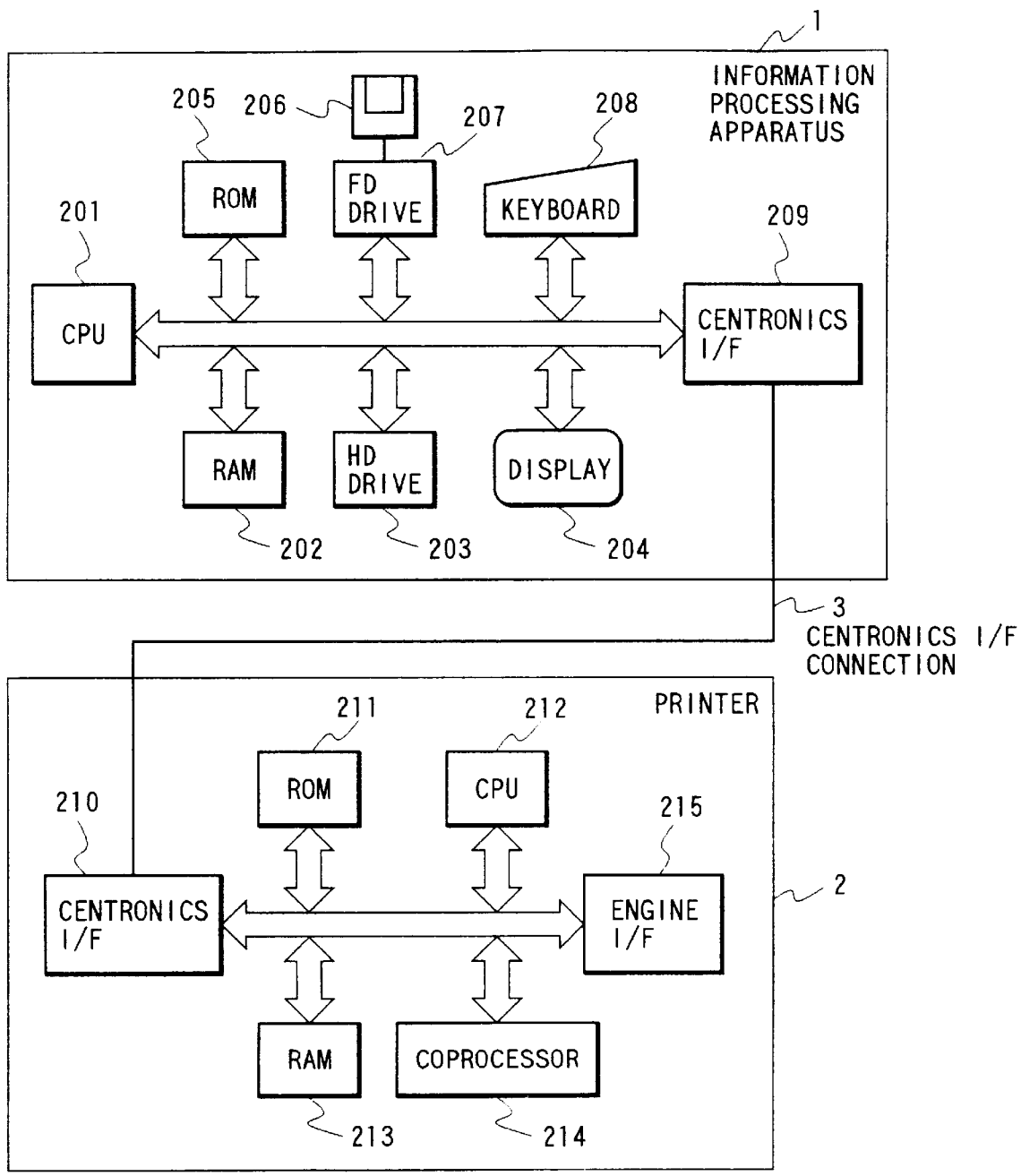
FIG. 2 is a block diagram in an information processing apparatus and a printer.

An internal construction of each apparatus is as shown in FIG. 2. The information processing apparatus 1 is constructed by: a CPU 201 for controlling each section and executing programs; a RAM 202 having a work area to execute the OS, an application program, or the like; an HD drive 203 to store a printer color processing mode automatic control program in the embodiment; a display 204 to display data, a result, or the like; a ROM 205 in which each program such as a program to perform document processes or the like, font, and various data (for example, data for a template) have been stored; an FD 206 in which a printer driver and the color processing mode automatic control program, which will be explained in the embodiment, have been stored; an FD driver 207 for reading the program or data stored in the FD 206 to the RAM 202 or HD drive 203; a pointing device (not shown) to input; a keyboard 208; and a centronics I/F 209 (host).

The CPU 201 executes, for example, a developing (rasterizing) process of outline fonts to a display information RAM set on the RAM 202, thereby enabling WYSIWYG to be performed on the display 204 such as a CRT or the like. The CPU 201 opens various registered windows on the basis of commands instructed by a mouse cursor or the like (not shown) on the display 204 and executes various data processes. When executing the printing, the user opens the window regarding the setting of the printing and can set the printer or can set a print processing method to a printer driver including the selection of a printing mode.

The printer 2 is constructed by: a centronics I/F 210 (printer) for receiving the print data from the information processing apparatus 1 via the centronics I/F connection 3; a ROM 211 in which control programs such as a mode switching control program and the like have been stored; a CPU 212 for integratedly controlling accesses to respective devices on the basis of the control programs or the like stored in the ROM 211 and outputting an image signal as output information to a printer engine (not shown) through an engine I/F 215; a RAM 213 functioning as a main memory and a work area of the CPU 212; a coprocessor 214 for executing a simple arithmetic operation; and the engine I/F 215 with an engine (not shown) for actually performing the conveyance of a paper and the printing. The printer 2 in the embodiment has a full color mode and a black and white mode as color processing modes. As will be explained hereinlater, the color processing modes can be further switched by a page unit of the print data by control information inputted from the host. The centronics I/F connection 3 can be replaced to a network and the centronics I/F 209 and 210 can be also replaced to a network I/F or network board and the embodiment can be also accomplished by them.

The CPU 212 can communicate with the information processing apparatus serving as a host computer through the centronics I/F 210 as an input unit and can notify the information processing apparatus 1 of information or the like in the printer. The RAM 213 can expand a memory capacity by an optional RAM connected to an extension port (not shown). The RAM 213 is used as an output information developing area, an environmental data storing area, an NVRAM, or the like.

Figure 3:
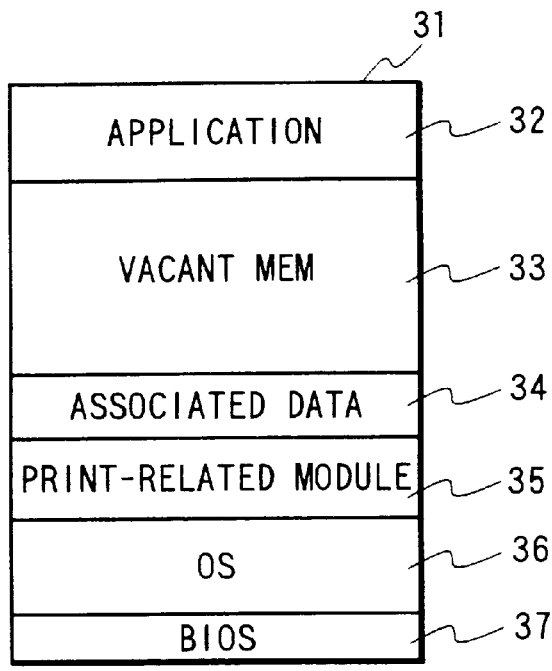
FIG. 3 is a memory map diagram of a state in which a print-related module including a printer color processing mode automatic control program is loaded into a RAM 202 and can be executed.

In the system with the above construction, FIG. 3 shows a memory map in a state in which a print-related module including a printer color processing mode automatic control program in the embodiment is loaded into the RAM 202 on the information processing apparatus 1 and can be executed.

A memory map 31 comprises: an area 32 in which an application program exists; a vacant memory 33; an associated data 34; a print-related module 35 including the printer color processing mode automatic control program; an OS 36; and a BIOS 37.

A color processing mode automatic control program including each command expressed by each step shown in FIGS. 4, 5, 7, 22A, 22B and 23 is stored as a print-related module including the printer color processing mode automatic control program into the FD 206 or HD drive 203 on the information processing apparatus 1 and functions as means that is accomplished when the CPU 201 executes such a program under the management of the OS 36.

According to the embodiment, in the information processing apparatus 1, the CPU 201 executes the BIOS, OS, the print-related module including the printer color processing mode automatic control program in the invention, and the application, so that they operate. The BIOS has been written in the ROM 205 and the OS has been written in the HD drive 203. When a power source of the information processing apparatus 1 is turned on, the OS is read out from the HD drive 203 into the RAM 202 by an IPL (Initial Program Loading) function in the BIOS program and the operation of the OS is started. A timing when the print-related module including the printer color processing mode automatic control program can actually be made operative is a timing when a printing process is executed on the information processing apparatus 1 by an application which operates under the management of the OS in response to an instruction from the user or the like. That is, in a state where the FD 206 in which the print-related module has been stored is set into the FD drive 207 or the print-related module has been saved in the HD drive 203, the print-related module is read out from the FD 206 or HD drive 203 under the controls of the OS and BIOS and is loaded into the RAM 202 and, at this timing, the print-related module is operated. As mentioned above, FIG. 3 shows the memory map in a state where the print-related module including the printer color processing mode automatic control program in the embodiment is loaded into the RAM 202 on the information processing apparatus 1 and is enabled to be executed.

The printer color processing mode automatic control program, which will be explained in the embodiment, has been stored in the HD drive 203 or ROM 205 of the information processing apparatus 1 or can be also constructed in a manner such that program codes are installed from a storing medium such as a floppy disk 206 or the like via the FD drive 207 and the functions of the invention are realized.

Further, a storing medium to store the above program is not limited to the floppy disk but it is also possible to use any one of a CD-ROM, a CD-R, a magnetooptic disk, an optical disk, a magnetic tape, a nonvolatile memory card, and the like.

In this case, the program codes themselves read out from the storing medium realize the novel function of the invention, so that the storing medium in which the program codes have been stored constructs the invention.

Figure 19:
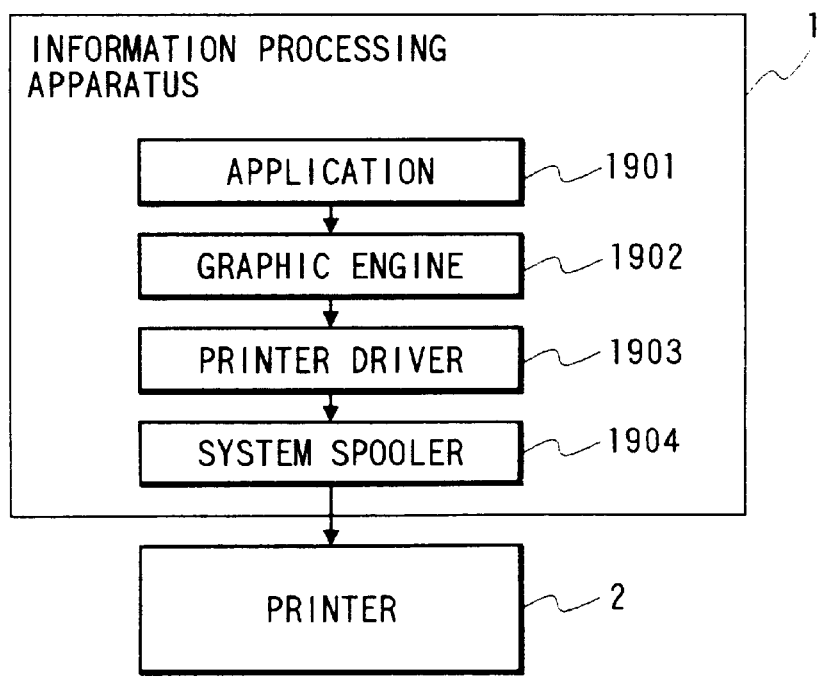
FIG. 19 is a block diagram showing a construction of a typical print system of a host computer to which the printer is connected.

FIG. 19 shows a constructional diagram of a typical printing process in an information processing apparatus such as a host computer or the like to which a printing apparatus such as a printer or the like is connected directly or via a network.

An application 1901, a graphic engine 1902, a printer driver 1903, and a system spooler 1904 exist as files preserved in the HD drive 203 as an external memory and are program modules which are loaded into the RAM 202 and executed by the OS or a module using those modules when they are executed. The application 1901 and printer driver 1903 can be added to the HD drive 203, FD 206, or a CD-ROM (not shown) serving as an external memory or to an HD as an external memory via the network (not shown).

Although the application 1901 preserved in the external memory is loaded into the RAM 202 and executed, when printing from the application 1901 to the printer 2, the print data is outputted (drawn) by using the graphic engine 1902 which can be similarly loaded into the RAM 202 and executed.

The graphic engine 1902 converts the print data into control commands of the printer by using the printer driver 1903 prepared every printing apparatus. The converted printer control commands are outputted to the printer 2 through the interface via the system spooler 1904 loaded in the RAM 202 by the OS.

Figure 20:
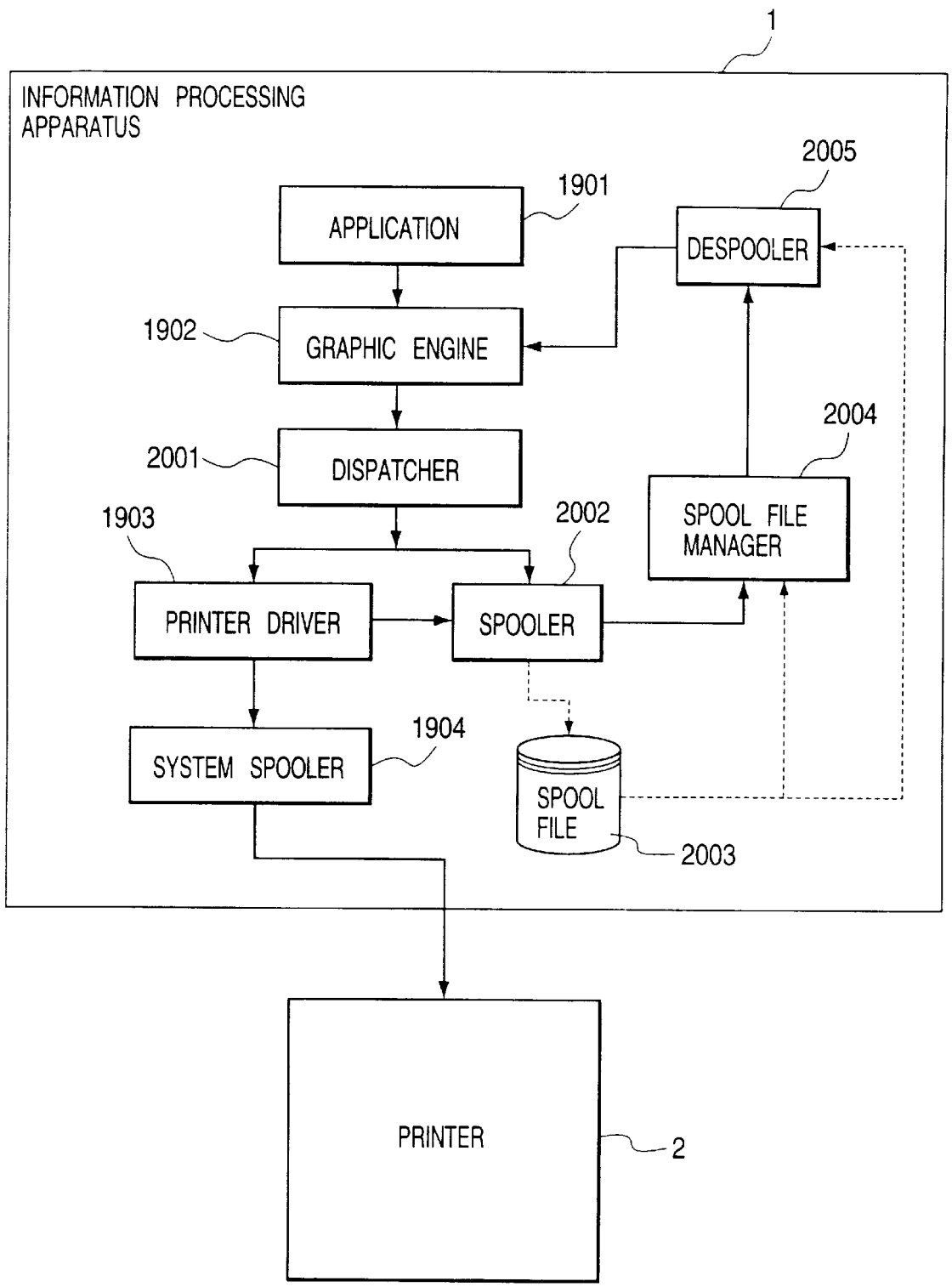
FIG. 20 is a block diagram showing a construction of a print system to temporarily spool a print command from an application into a spool file before converting into a printer control command.

In addition to the printing system comprising the printer and the information processing apparatus shown in FIG. 19, a printing system of the embodiment further has a construction such that the print data from the application is temporarily spooled as intermediate code data as shown in FIG. 20.

FIG. 20 shows a system obtained by expanding the system of FIG. 19 and has a construction such that when a print command is sent from the graphic engine 1902 to the printer driver 1903, a spool file 2003 comprising intermediate codes is temporarily generated. In the system of FIG. 19, the application 1901 is released from the printing process at a time point when the printer driver 1903 finishes the conversion from all of the print commands from the graphic engine 1902 into the control commands of the printer. On the other hand, in the system of FIG. 20, the application 1901 is released from the printing process at a time point when the spooler 2002 converts all of the print commands into the intermediate code data and the intermediate code data is outputted to the spool file 2003. Generally, a time required to release the application 1901 from the printing process in the latter system is shorter than that in the former system.

The system shown in FIG. 20 can modify the contents of the spool file 2003. Thus, a function which is not provided for the application, namely, a function such that a print page is enlarged or reduced or a plurality of pages are reduced and printed in one page for the print data from the application can be realized.

For the above purposes, as compared with the system of FIG. 19, the system is expanded so as to spool the print data by the intermediate code data as shown in FIG. 20. In order to modify the print data, generally, such a process is set from the window provided by the printer driver 1903 and the printer driver 1903 preserves the set contents into the RAM 202 or HD 203.

FIG. 20 will now be described in detail hereinbelow. As shown in the diagram, according to the expanded processing system, a despatcher 2001 receives the print command from the graphic engine 1902. When the print command received by the despatcher 2001 from the graphic engine 1902 is the print command issued from the application 1901 to the graphic engine 1902, the despatcher 2001 loads the spooler 2002 stored in the HD 203 as an external memory into the RAM 202 and sends the print command to the spooler 2002 instead of the printer driver 1903.

The spooler 2002 converts the received print command into the intermediate code and outputs to the spool file 2003. From the printer driver 1903, the spooler 2003 obtains the setting of modification regarding the print data set for the printer driver 1903 and preserves into the spool file 2003. Although the spool file 2003 is generated as a file on the HD 203 as an external memory, it can be also generated on the RAM 202. Further, the spooler 2003 loads a spool file manager 2004 stored in the HD 203 as an external memory into the RAM 202 and notifies the spool file manager 2004 of a generating situation of the spool file 2003. After that, the spool file manager 2004 discriminates whether the printing can be performed or not in accordance with the contents of the setting of modification regarding the print data preserved in the spool file 2003.

When the spool file manager 2004 determines that the print data can be printed by using the graphic engine 1902, a despooler 2005 stored in the HD 203 is loaded into the RAM 202 and the despooler 2005 is instructed so as to perform the printing process of the intermediate codes described in the spool file 2003.

The despooler 2005 processes the intermediate codes included in the spool file 2003 in accordance with the contents of the setting of modification included in the spool file 2003 and again outputs the processed codes via the graphic engine 1902.

When the print command received by the despatcher 2001 from the graphic engine 1902 is the print command issued from the despooler 2005 to the graphic engine 1902, the despatcher 2001 sends the print command to the printer driver 1903 instead of the spooler 2002.

The printer driver 1903 generates a printer control command and outputs to the printer 2 via the system spooler 1904.

Figure 21:
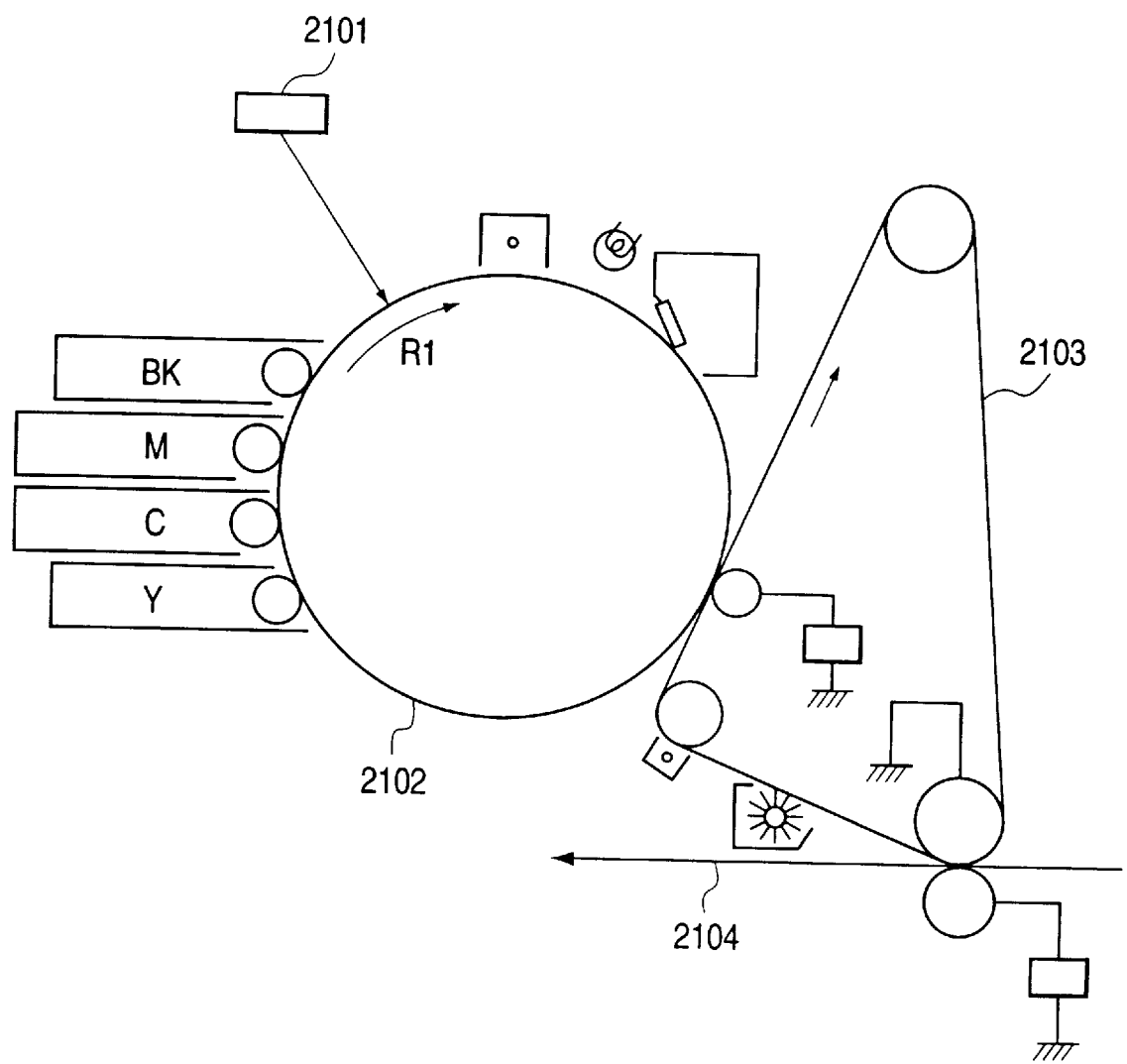
FIG. 21 is a diagram for explaining the printer.

FIG. 21 is a cross sectional view of a color printer having a printing function as an example of the printer 2.

According to the printer, a laser beam modulated by image data of each color which is derived on the basis of the print data inputted from the information processing apparatus 1 scans a photosensitive drum 2102 by a polygon mirror 2101, thereby generating an electrostatic latent image. A visible image is obtained by developing the electrostatic latent image by toner and is multiplex transferred onto an intermediate transfer belt 2103 with respect to all colors, thereby forming a color visible image. Further, the color visible image is transferred to a transfer material 2104, thereby fixing the color visible image onto the transfer material 2104. An image forming section to perform the above control is constructed by: a drum unit having the photosensitive drum 2102; a primary charging unit having a contact charging roller; a cleaning unit; a developing unit; the intermediate transfer belt 2103; a paper feed unit including paper cassettes and various rollers; a transfer unit including a transfer roller; and a fixing unit.

The detailed explanation of each component unit is omitted here because they are the same as those in the conventional apparatus.

Figure 4:
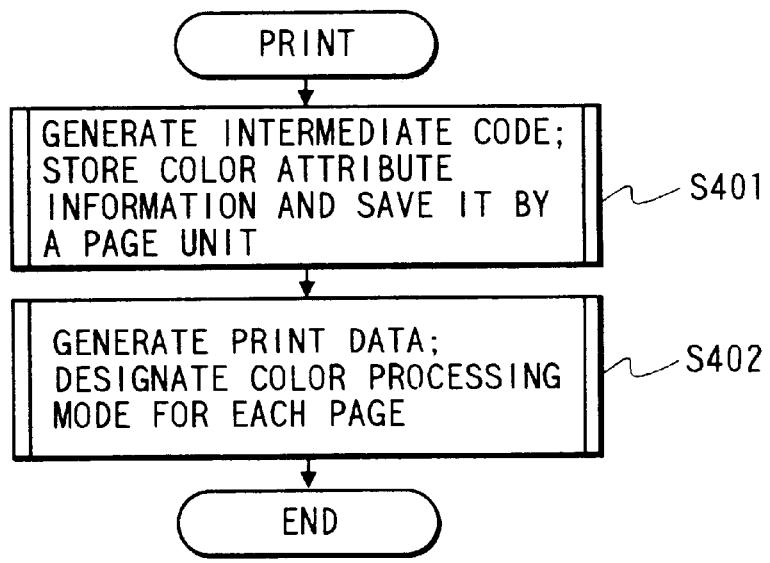
FIG. 4 is a flowchart showing an outline of the printer color processing mode automatic control program.

FIG. 4 shows a flowchart schematically showing the printer color processing mode automatic control program in the embodiment.

First, the processing routine comprises two processing steps (steps 401 and 402). That is, in step 401, upon execution of the printing operation, the CPU 201 converts the print data (for example, code data) received from the application into the intermediate codes, forms the intermediate codes to be temporarily saved in the HD 203, stores information of a color attribute of each print data in which there is a print request from the application into the RAM 202, and preserves the information by a page unit. In step 402, on the basis of the intermediate codes which were temporarily saved and the color processing mode information of each page which was generated in step 401 and stored in the RAM 202, the print data formation to generate the print data to be transmitted to the printer 2 and the color processing mode of each page are designated.

In the embodiment, the intermediate code is generated from the print data and, after that, the CPU 201 discriminates the color attribute of the print data. However, the invention is not obviously limited to such an example. However, in the conventional color printer having a plurality of color processing modes, since data to be received differs depending on the mode, the output data which is outputted needs to be changed in accordance with the mode on the information processing apparatus. In the embodiment, therefore, the intermediate code is generated not only in order to rapidly release the application from the printing process but also in order to enable the print data to be modified for an edition or the like of the function which is not provided for the application or the function which is not provided for the printer.

Even if the intermediate code is not generated, the embodiment can be also executed. For example, it is also possible to consider a method whereby the CPU 201 once analyzes the code data as print data, thereby discriminating the color attribute of the print data and, after that, the output data in accordance with the color attribute is generated. The reason why the CPU 201 discriminates the color attribute before the output data is generated as mentioned above is because the output data which is generated by the color attribute discriminated as mentioned above differs. In other words, if it is sufficient to use the black and white data, color information is unnecessary and it is sufficient to merely set a flag indicative of a monochromatic mode into the data. When the color attribute indicates color, a color flag in the data has to be set (it is also possible not to merely set the monochromatic flag) and the output data having the color information has to be generated. As mentioned above, in order to realize the above construction by the conventional printer, it is necessary to discriminate the color attribute before the output data is generated.

However, in case of a printer in which the kinds of data which is handled in the monochromatic mode and the color mode are not different, after the output data was generated, it is also possible to add the color attribute information to the data and to transfer the resultant data to the printer.

Figure 5:
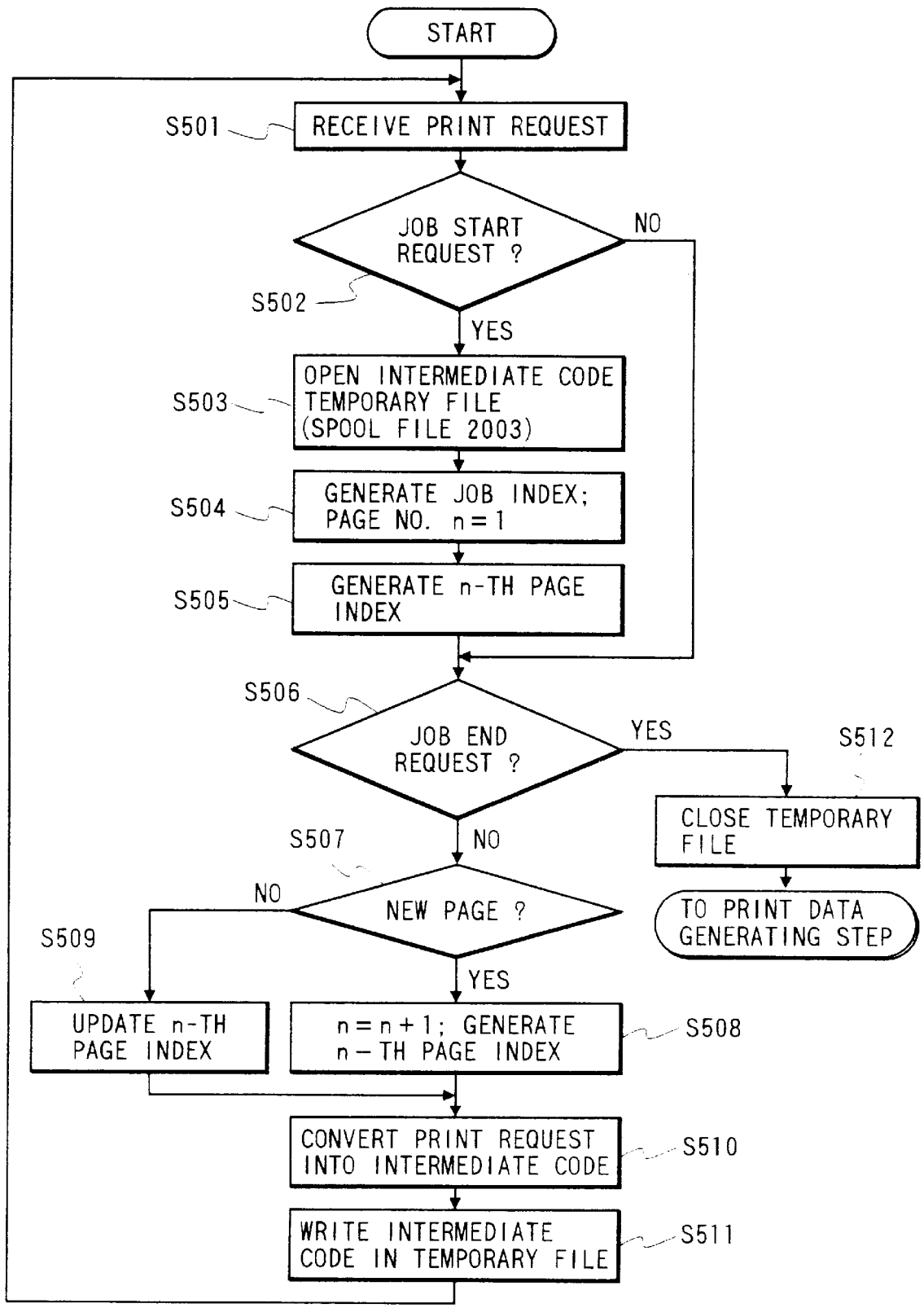
FIG. 5 is a flowchart showing detailed processes for a step of generating an intermediate code, storing a color attribute, and saving it by a page unit in the printer color processing mode automatic control program.

FIG. 5 shows a flowchart for the detailed processes of the CPU 201 in the step (step 401) of generating the intermediate code, storing the color attribute, and saving it by the page unit shown in FIG. 4. In the embodiment, those processes are executed when the spool file 2003 is generated in the spooler 2002.

First in step 501, a print request from the application is received. In step 502, the CPU 201 discriminates whether the received print request is a job start request or not. If the CPU 201 determines in step 502 that the print request is the job start request, step 503 follows. The spool file 2003 as an intermediate code temporary file to temporarily save the intermediate code and identifier to identify the job are generated in the HD drive 203 of the information processing apparatus 1 and the generated spool file 2003 is opened.

In step 504, the progress of the printing process and the job identifier to correlate the spool file with a notification are notified to the spool file manager 2004 and the number of pages is initialized to a format shown in FIG. 8 in order to preserve color attribute information of the print data every page. That is, a page counter n indicative of the page number is set to 1. This means that the process of the first page is being executed.

In step 505, an n-th page index is formed in an area of the associated data 34 on the RAM 202. It is assumed that as for the associated data 34, data of the n-th page is added to the last portion of the table in association with an increase in number of pages.

In step 502, when the CPU 201 decides that the print request is not the job start request, step 506 follows.

In step 506, the CPU 201 discriminates whether the received request is a job end request or not. If the CPU 201 determines that the received request is not the job end request, step 507 follows and a check is made to see if the received request is a new page request. If the CPU 201 determines in step 507 that it is the new page request, step 508 follows. The progress of the printing process and the color processing mode are notified to the spool file manager 2004. The CPU 201 increases the count value of the page number counter by "1", forms a page index of the next page into the area of the associated data 34 on the RAM 202 and sets "black and white" as an initial value of the color processing mode. In the spool file manager 2004, the color processing mode for each logic page is stored, for example, in a format as shown in FIG. 8 and is referred when deciding the color processing mode to each physical page in the spool file manager 2004, which will be explained hereinlater.

In step 507, when the CPU 201 decides that the print request from the application is not the new page request, step 509 follows and the color processing mode information table of the n-th page of the n-th page index is updated in accordance with the information of the color attribute shown in the print request. For example, when the color processing mode set at the first page before updating is the black and white mode, if the print request received from the application is a request to draw a full color image, in order to draw a full color image, the color processing mode of the first page is changed to full color. When no full color image is drawn until the end of the page, the apparatus is set into the black and white mode as an initial value as it is. In the embodiment, it is assumed that when even one print request having the color attribute of full color exists in the same page, the color processing mode of such a page is set to full color.

In step 510, the data is converted into the intermediate code in order to store into the spool file 2003 for the print request. In step 511, the intermediate code is written into the intermediate code temporary file provided in the HD drive 203. After that, the processing routine is returned to step 501 and the print request from the application is again received. A series of processes from step 501 to step 511 are continued until the job end request is received from the application. In step 506, if the CPU 201 decides that the print request from the application is the job end request, this means that the processes of all of the print requests from the application have been finished. Therefore, step 512 follows and the progress of the printing process is notified to the spool file manager 2004, the spool file 2003 is closed, the next print data is generated, and the processing routine advances to a step of designating the color processing mode.

FIG. 6 shows contents of the intermediate code data temporary file which is generated on the HD drive 203 by the step of forming the intermediate code, storing the color attribute, and saving it by a page unit (step 401) in FIG. 4. In FIG. 6, although [JOB START], [NEW PAGE] (FF), [CHR PRINT], etc. are described, they are expressions for convenience of understanding of the print data in the file and have actually been stored in a binary format.

Figure 7:
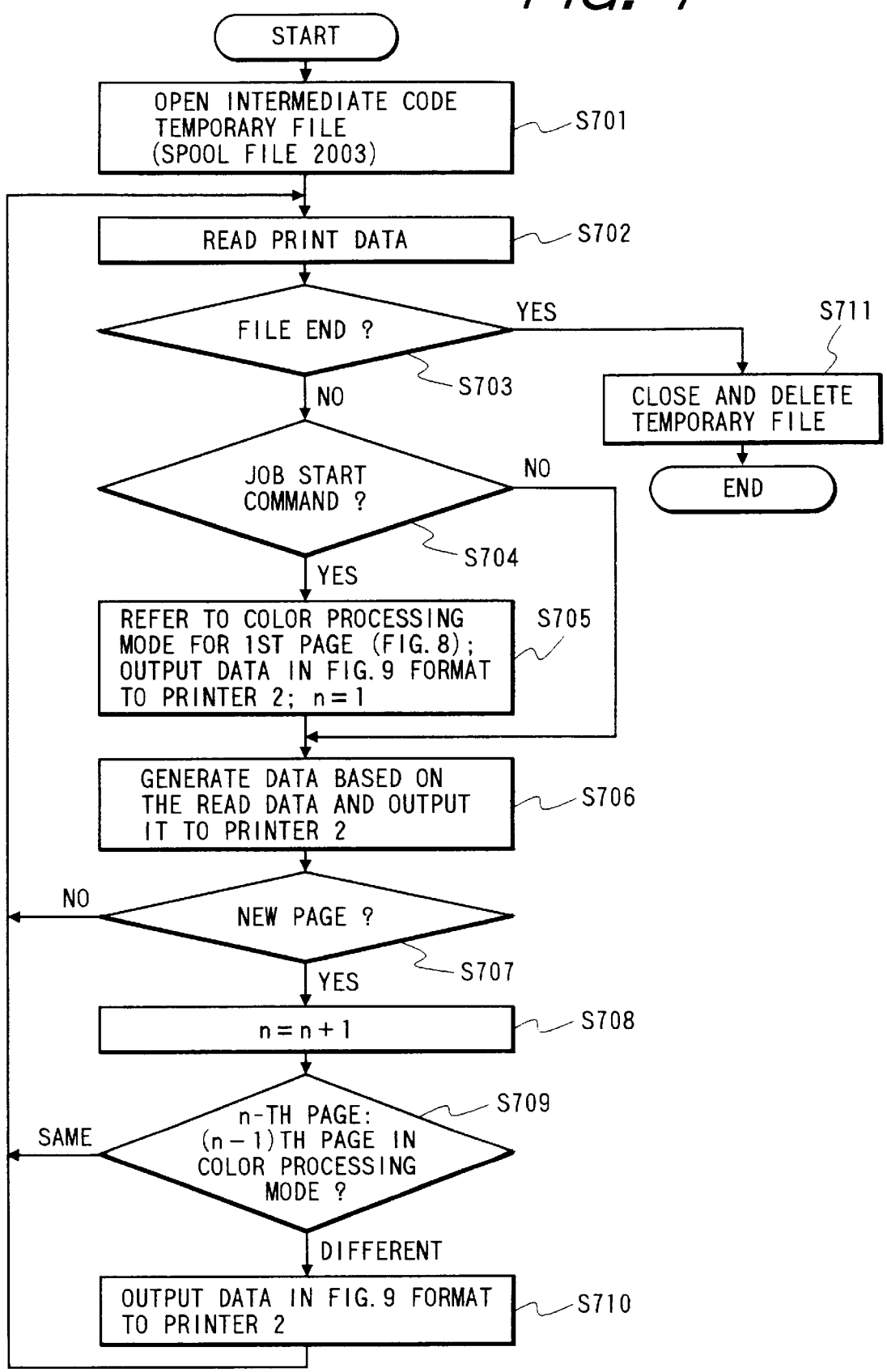
FIG. 7 is a flowchart showing detailed processes for a step of forming print data and designating each page color processing mode in the printer color processing mode automatic control program.

FIG. 7 is a flowchart showing the detailed processes of the CPU 201 in the step of generating the print data and designating each page color processing mode (step 402) shown in FIG. 4.

In the step of generating the print data and designating the color processing mode, first in step 701, the CPU 201 opens the intermediate code data temporary file provided in the HD drive 203. As mentioned above, an example of the contents of the intermediate code temporary file is as shown in FIG. 6. Subsequently, the retrieval of the print data is actually started. First in step 702, the CPU 201 reads out the print data by a print command unit shown in FIG. 6. The print data which is first read out from the print data shown in FIG. 6 is [JOB START]. Subsequently, the following print data is read out up to the file end. In the print data reading step, the CPU 201 discriminates about the file end in step 703. If the CPU 201 determines that the reading position is not the file end, step 704 follows and a check is further made to see if the print data is [JOB START]. If the CPU 201 decides that it is [JOB START], step 705 follows and the color processing mode of the first page shown in FIG. 8 is referred. Subsequently, the CPU 201 generates output data by a format shown in FIG. 9 and outputs to the printer 2. In case of the embodiment, since the color processing mode of the first page is the full color mode, data that is outputted to the printer 2 is <ESC>[1'p. Further, a variable to hold the page position information which is at present being processed is stored in the RAM 202 and initialized. As mentioned above, by storing the data designating the color processing mode to the beginning of the output data, the process by the printer is made easy.

In step 704, when the CPU 201 decides that the print data is not [JOB START], step 706 follows. In step 706, the CPU 201 generates output data on the basis of the data read out from the intermediate code temporary file stored in the HD drive 203 and outputs the output data to the printer 2. In step 707, the CPU 201 discriminates whether the read-out print data is [NEW PAGE] or not. When the CPU 201 determines in step 707 that it is not [NEW PAGE], the processing routine is returned to step 702 and the processes are continued.

When the CPU 201 decides that the read-out data is [NEW PAGE], the output data indicative of [NEW PAGE] is outputted to the printer 2. The processing routine advances to step 708. In step 708, the page position information variable which was formed on the RAM 202 and is at present being processed in step 705 is increased by "1" by the CPU 201, thereby increasing the page number. With this method, the page position which is being read is always made correspond to the page position information.

In step 709, the CPU 201 compares whether the color processing mode at the page before the page position information variable is increased and the color processing mode at the page after it was increased are different or not. If the CPU 201 determines that those color processing modes differ, step 710 follows. The data designating the color processing mode is added and output data is generated in the format shown in FIG. 9 in accordance with the color processing mode at the page after the page position information variable was increased, and the output data generated in this step is supplied to the printer 2. The processing routine is returned to step 702. For example, in the embodiment, the print data is data of total five pages and the color processing mode is set to the full color mode for the first and second pages and to the black and white mode for the third and subsequent pages as shown in FIG. 8. Therefore, a color processing mode designation command is actually outputted to the printer 2 total two times; namely, at the time of the first designation of the full color mode and at the time of the designation of the monochromatic mode Just after new page data of the second page was received. In the comparison in step 709, when the CPU 201 decides that those color processing modes are the same, since there is no need to designate the color processing mode, the color processing mode is not instructed but the processing routine is returned to step 702 and the processes are continued.

In step 703, when the CPU 201 decides that the reading position is the file end by identifying the job end command or the like, output data indicative of the job end is supplied to the printer 2. Step 711 follows. In step 711, after the intermediate code temporary file provided in the HD drive 203 was closed, the CPU 201 deletes the intermediate code temporary file and erases all of the information such as page position information variable and the like formed on the RAM 202. The processes are finished. With this method, it is constructed such that after the output data was transferred to the printer 2, none of the intermediate code and the like is left in the information processing apparatus 1.

As mentioned above, FIG. 8 shows the example of the color processing mode information of the print data of every page which is formed in the associated data area 34 on the RAM 202 by the step of forming the intermediate code, storing the color attribute, and saving it by the page unit (step 401) in FIG. 4. FIG. 9 shows the example of the color processing mode designation command.

In the embodiment, although the medium to store the print-related module including the printer color processing mode automatic control program is the FD or HD drive 203, another medium such as CD-ROM, IC memory card, or the like can be also used. Further, it is also possible to construct in a manner such that the printer color processing mode automatic control program itself or the print-related module including the printer color processing mode automatic control program is stored in the ROM 205, is made function as a part of the memory map, and is directly executed by the CPU 201.

According to the embodiment as mentioned above, by deciding the color processing mode of the print data by the page unit in the information processing apparatus, the color processing mode can be changed every page in the printer, so that the toner can be reduced and a print throughput can be improved.

In the first embodiment, in the case where the print-related module which operates on the information processing apparatus 1 or the print module which operates in the printer 2 has a function (n-page printing function) for reducing a plurality of print pages (logical pages) and laying out in one page (physical page), the processes in the case where the printing using the n-page printing function is designated at the time point when the printing process is executed by the application which operates under the OS management on the information processing apparatus 1 will now be described in the embodiment.

Figure 13:
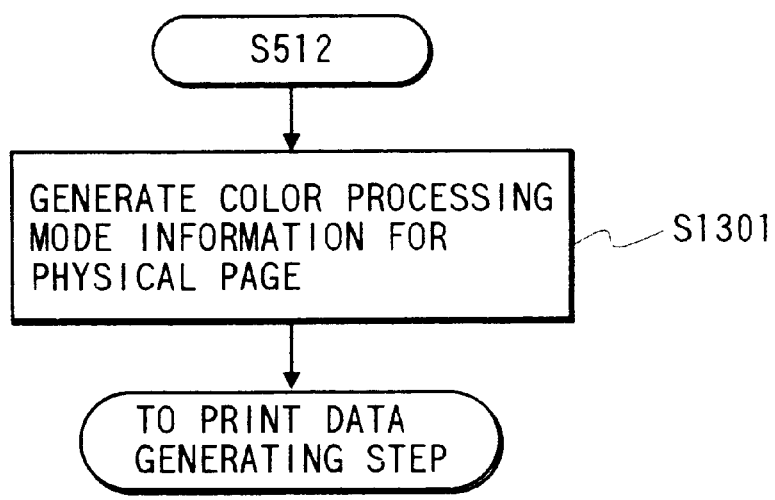
FIG. 13 is a flowchart showing a flow for processes of the printer color processing mode automatic control program in a reduction printing mode.

Explanation will be first made with reference to FIG. 13. For instance, a case where a print request of data as much as eight pages is received by a four-page printing from the foregoing application will be described.

Figure 10:
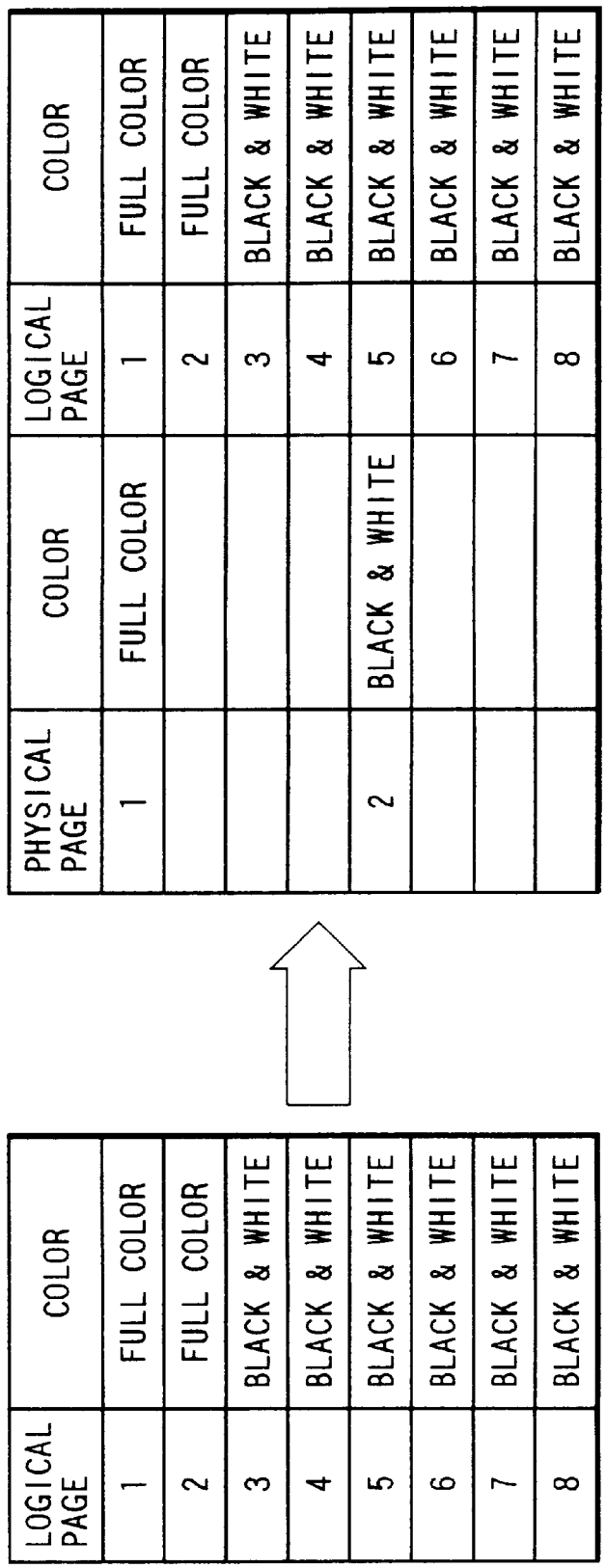
FIG. 10 shows an example of data showing a color processing mode of every page which is formed in the RAM 202 in the embodiment.

It is assumed that after completion of the process in step 512 in FIG. 5 as a color processing mode automatic control program in the embodiment, the color attribute information of the logical pages as many as eight pages has been stored as shown in the left side table in FIG. 10. The processing routine advances to step 1301 in FIG. 13. In step 1301, color processing mode information of the physical page is formed on the RAM 202 as shown in the right side table in FIG. 10 from the color attribute information stored in the associated data 34 in the RAM 202. In the embodiment, since the logical pages are four pages and the physical page is one page, in the example shown in FIG. 10, the color processing modes of the pages 1 and 2 of the logical page data are set to the full color mode. Therefore, the color processing mode of the physical page 1 is decided to be full color. Since the color processing modes of pages 5 to 8 of the logical page data are the black and white mode, the physical page 2 is determined to be black and white.

Figure 14:
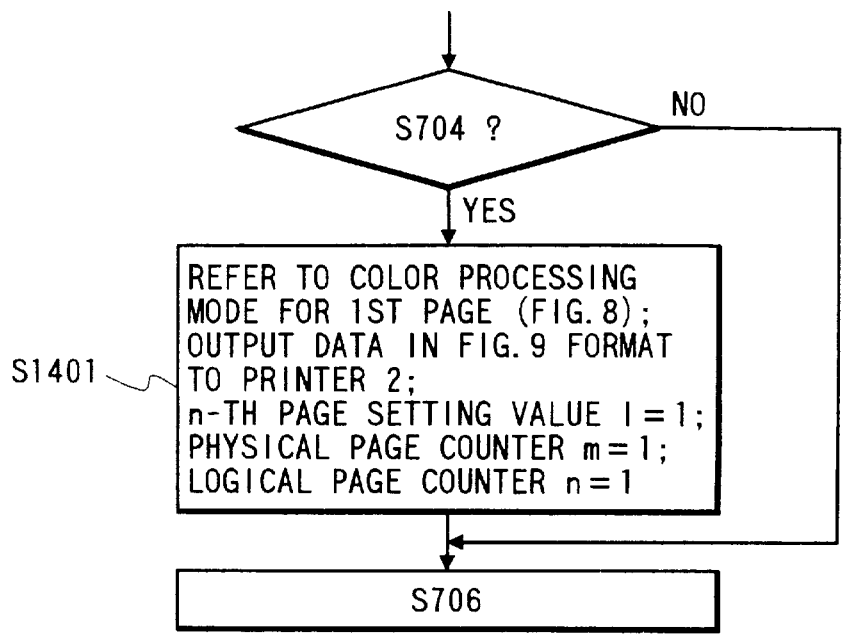
FIG. 14 is a flowchart showing a flow for processes of the printer color processing mode automatic control program in a reduction printing mode.
Figure 15:
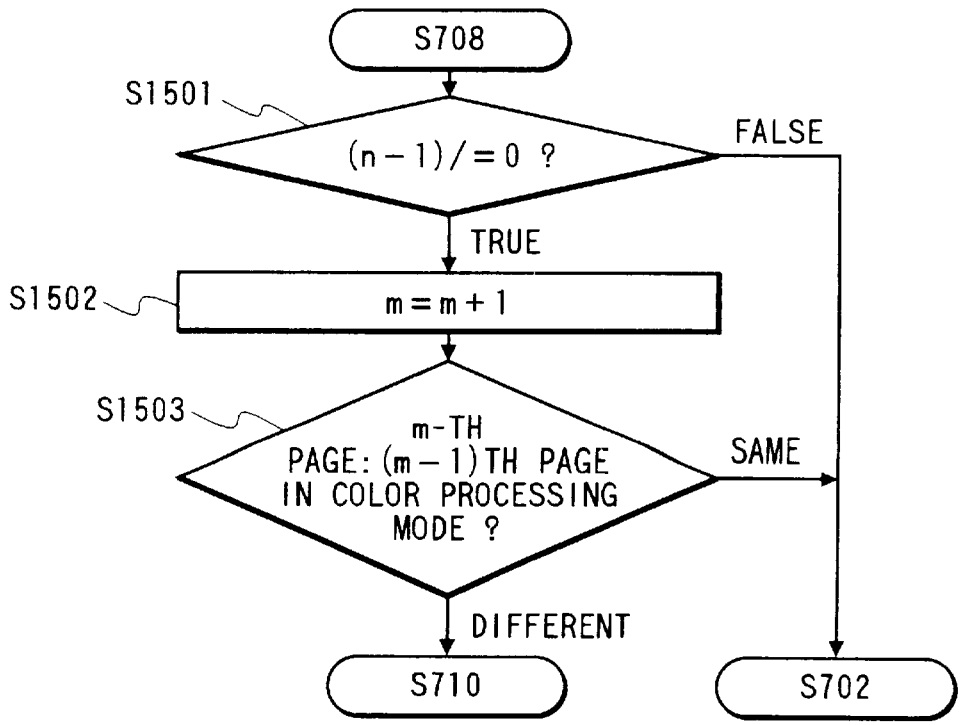
FIG. 15 is a flowchart showing a flow for processes of the printer color processing mode automatic control program in a reduction printing mode.

Subsequently, the process in the print data forming step shown in FIG. 7 is executed. This process will now be described with reference to FIGS. 14 and 15. The process in the print data forming step is fundamentally the same as that in the foregoing embodiment. The process which is changed due to a page reducing mode exists at three locations and as shown in FIGS. 14 and 15. At the first location, the processing routine advances to a process in step 1401 in place of the process in step 705. In step 1401, the color processing mode of the first page shown in FIG. 8 is referred, and subsequently, the CPU 201 generates output data in the format shown in FIG. 9 and supplies to the printer 2. Further, an n-page print setting value l, a physical page counter m, and a logical page counter n which are at present being processed are initialized.

At the second location, processes in steps 1501 to 1503 are executed in place of the process in step 709. In step 1501, the CPU 201 discriminates whether the print data which is at present being formed is the data of the first page of the logical page or not. If the CPU 201 decides that the print data which is at present being formed is the data of the first page of the logical page, since this means that the processing page is a new physical page, the processing routine advances to step 1502. When the CPU 201 determines that the processing page is not the first page of the logical page, since this means that the print data of the previous physical page is still being formed, the processing routine is returned to step 702.

In step 1502, the output data indicative of a new page is formed and supplied to the printer 2 and the physical page counter is increased, thereby allowing it to correspond to the page that is actually printed. The processing routine advances to step 1503. In step 1503, the CPU 201 compares the color processing mode of the physical page at which the print data is at present being formed with the color processing mode stored in the RAM 202 of the physical page of one page before. If the CPU 201 decides that those color processing modes are the same, since there is no need to change the color processing mode, the processing routine is returned to step 702. If the CPU 201 determines that the color processing modes are different, step 710 follows to generate a designation command to change the color processing mode. The subsequent processes are the same as those in FIG. 7.

At the third location, in step 707 in FIG. 7, even when the CPU 201 decides that the print data is the new page command, the formation of the output data indicative of new page and the output to the printer 2 are not performed in this step but such a discrimination is executed in step 1502 mentioned above.

In the embodiment as mentioned above, by adding the above process to the foregoing embodiment, the output of the color processing mode designation command by the logical page unit is suppressed and the data is outputted by the physical unit page, so that contradiction such that a plurality of color processing modes are designated on the same physical page is avoided and the n-page printing can be performed in the optimum color processing mode.

In the case where the printer 2 has a double-sided printing function and in the case where a plurality of recording materials can be held in a transfer drum shape and, further, in order to improve the performance in the double-sided printing mode, the printer has therein a mechanism such that after one side was printed, a plurality of recording materials are temporarily pooled for a reverse side printing, processes in the case where the printing using the double-sided printing function is designated at the time point when the printing process is executed by the application which operates under the OS management on the information processing apparatus 1 will now be described in the embodiment.

Figure 12:
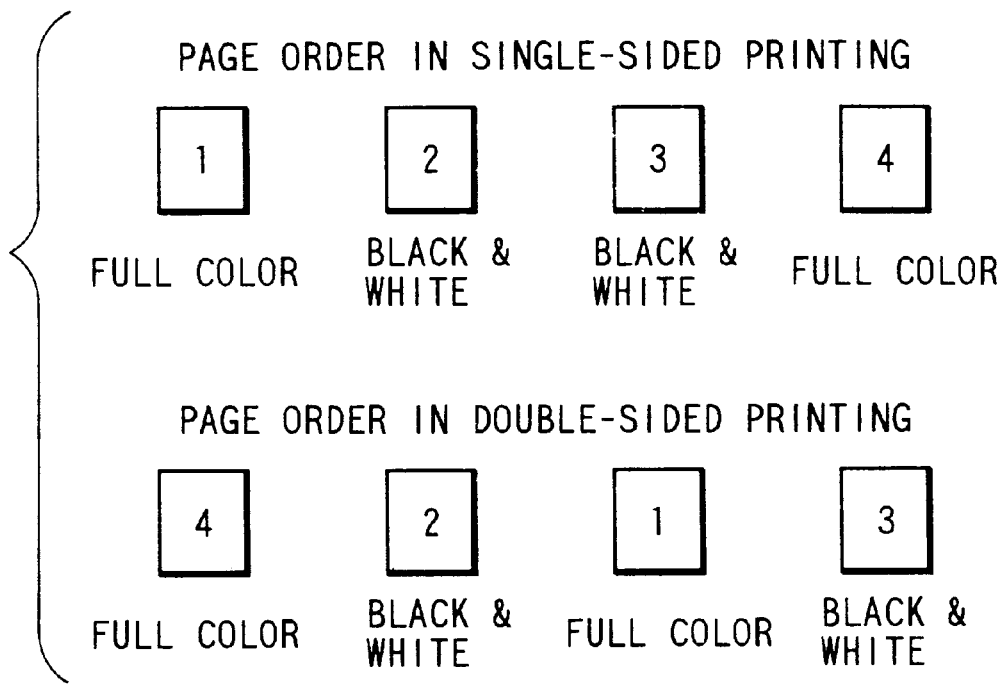
FIG. 12 shows an example in the case where color processing mode switching timings in a single-sided printing mode and a double-sided printing mode are different.

FIG. 12 is a diagram showing a difference between the page order in the single-sided printing mode and the page order in the double-sided printing mode.

The page order shown in the upper portion in FIG. 12 relates to the single-sided printing mode and it is the numeral order such as 1 and 2 to 4 as shown in the diagram so long as the printer is a face-down printer. When the color processing modes are determined as shown in the diagram, as for the designation timing of the color processing mode, the color processing mode has to be designated three times such as color for the first page, black and white for the second page, and color for the fourth page. The page order shown in the lower portion in FIG. 12 relates to the double-sided printing mode. Pages 1 and 2 show the right side and the reverse side of the first page and pages 3 and 4 show the right side and the reverse side of the second page. In the embodiment, the printer is set to the face down mode and a plurality of recording materials can be attached to the transfer drum. In this instance, when considering a print throughput, the printing is started from the reverse side of the second page, the printing of the reverse side of the first page is executed, and the recording materials are temporarily held in the printer double-sided unit. After that, the recording materials are sequentially adhered onto the transfer drum from the top of the recording materials held in the printer double-sided unit in a state where the reverse and right sides are reversed. The recording materials are recorded and delivered. Therefore, such an order is used in order to first eject the first page in the last output order. When the data is transmitted from the information processing apparatus 1 to the printer 2 in the same color processing mode as that shown in the same diagram, since the page order is set to the order as shown in the lower portion of FIG. 12 in the double-sided printing mode, as for the switching timing of the color processing modes, the color processing mode has to be designated to color for the first page, black and white for the second page, color for the third page, and black and white for the fourth page.

FIG. 16 shows a situation of a paper conveyance in the printer 2 at the time of the execution of the double-sided printing. The double-sided printing of two papers will now be described.

In the printer, when continuous four-page data is received, in step 1 in the table, page 4 as a reverse side of page 2 is first printed and the printed paper is pooled in the printer double-sided unit. Step 2 in the table shows a state where page 2 as a reverse side of page 1 is printed and the printed paper is pooled in the double-sided unit in a manner similar to page 4. Step 3 in the table shows a state where the paper (the first page) on which page 2 as a reverse side of the page 1 has already been printed is subsequently fed by the double-sided unit, page 1 as a right side of page 1 is printed, and the printed paper is delivered to a deliver tray in a face down state. Step 4 in the table shows a state where the paper on which page 4 as a reverse side of page 2 has been printed is fed, page 3 as a right side of page 2 is printed, and the paper is delivered to the delivery tray in a face down state. For simplicity of explanation, the drawing is shown on the assumption that in step 3 in the table, page 2 on which page 4 has been printed exists in the printer double-sided unit and page 1 in which double sides have been printed exists in the delivery tray. However, in the embodiment, actually, since the transfer drum on which two papers can be simultaneously adhered has been shown as an example, page 2 is continuously outputted after page 1 and they cannot simultaneously exist in the printer double-sided unit and the delivery tray.

Figure 18:
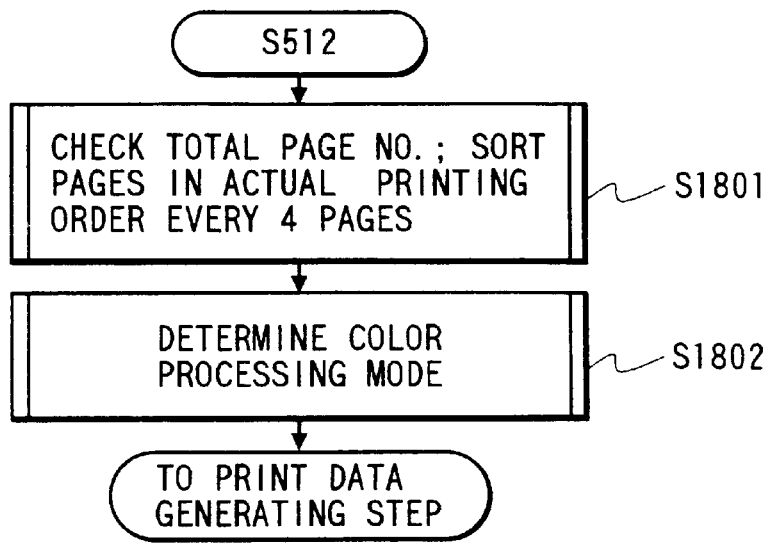
FIG. 18 is a flowchart showing a flow of processes of the printer color processing mode automatic control program in the double-sided printing mode.

The above processes will now be described with reference to a flowchart of FIG. 18.

Figure 11:
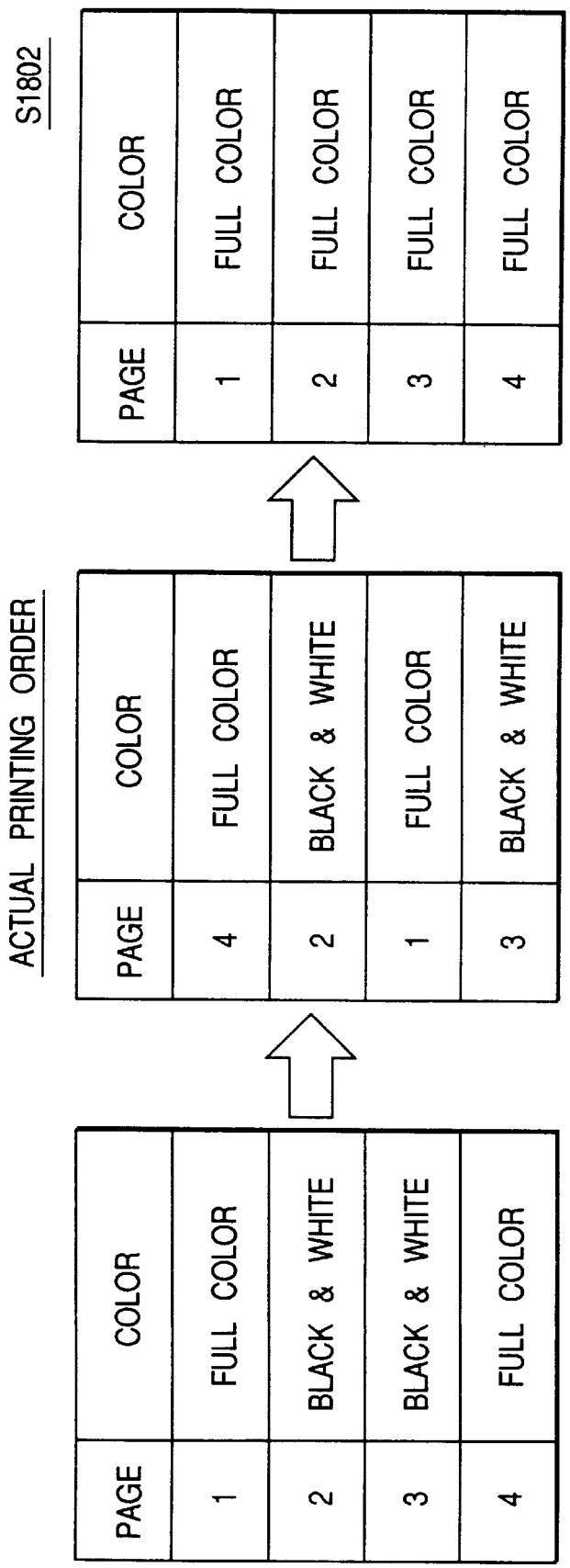
FIG. 11 shows an example of data showing a color processing mode of every page which is formed in the RAM 202 in the embodiment.

When a print request of the data as much as four pages is received from the application, in the color processing mode automatic control program in the embodiment, after the end of the process in step 512 in FIG. 5 shown in the embodiment, in step 1801, the printer CPU 212 first confirms the total number of pages from the color processing mode information of every page as much as four pages shown in the left side table in FIG. 11 and sorts the left side table in FIG. 11 in accordance with the actual printing order by a four-page unit, thereby obtaining the center table in FIG. 11. In case of the embodiment, as shown in the left side table in FIG. 11, since pages 1 and 4 are set to the full color mode and pages 2 and 3 are set to the black and white mode, in the actual printing order, the color processing modes are alternately set to the full color mode and the black and white mode as shown in the center table. In step 1802, a result in which the color processing mode of each page has been again determined so as to minimize the print throughput on the basis of FIG. 17 from the center table in FIG. 11 is shown in the right side table.

FIG. 17 shows a desired time necessary to execute each process.

For example, it is now assumed that the printing time of the first page is equal to 30 seconds in case of full color and to 10 seconds in case of black and white because of the initialization of the printer, development of the data, and the like. In this instance, the printing time of the continuous pages is equal to 10 seconds per paper in case of full color and to 2.5 seconds in case of black and white. This is because a plurality of papers are adhered to the transfer drum. In the full color mode, since there are four colors of M (magenta), Y (yellow), C (cyan), and BK (black) in the full color mode and it is necessary to rotate the transfer drum four times, it takes a time that is four times as long as the time in the black and white mode. Therefore, when the color processing mode is switched, as for a time which is required for waiting for the paper delivery, when switching from the black and white mode to the full color mode, the color processing mode can be switched from the black and white mode to the full color mode after the elapse of 2.5 seconds because the black and white page is delivered. On the other hand, the color processing mode can be switched from the full color mode to the black and white mode after the elapse of 10 seconds because the full color page is delivered.

In the embodiment, on the basis of the delivery waiting time in association with the fundamental printing time data and the switching of the color processing mode shown in FIG. 17, it is assumed that the timing when the color processing mode is actually switched is set to the case where the printing in the same processing mode continues by two or more pages. Therefore, as shown in the table on the right side in FIG. 11, in the embodiment, all pages are printed in the full color mode.

The above processes are not limited to the case of the double-sided printing mode but are also performed in the ordinary printing mode.

As mentioned above, by automatically deciding the color processing mode so as to set the print throughput to the highest value on the basis of the time that is required for waiting for the paper delivery for the switching of the color processing mode, the printing time of the print data having a plurality of color processing modes can be minimized.

In the first embodiment, although the color processing mode has automatically been set so as to maximize the print throughput, the color processing mode can be also automatically set so as to reduce a consumption quantity of toner. In such a case, even when alternately printing in the color mode and the monochromatic mode, all pages are not always set to the color mode but it is necessary to alternately set the color mode and the monochromatic mode.

[Second embodiment]

In the second embodiment, a function for despooling the output possible physical page while the spool file manager 2004 is spooling the intermediate code into the spool file 2003 will now be described.

Figures 22, 22A:
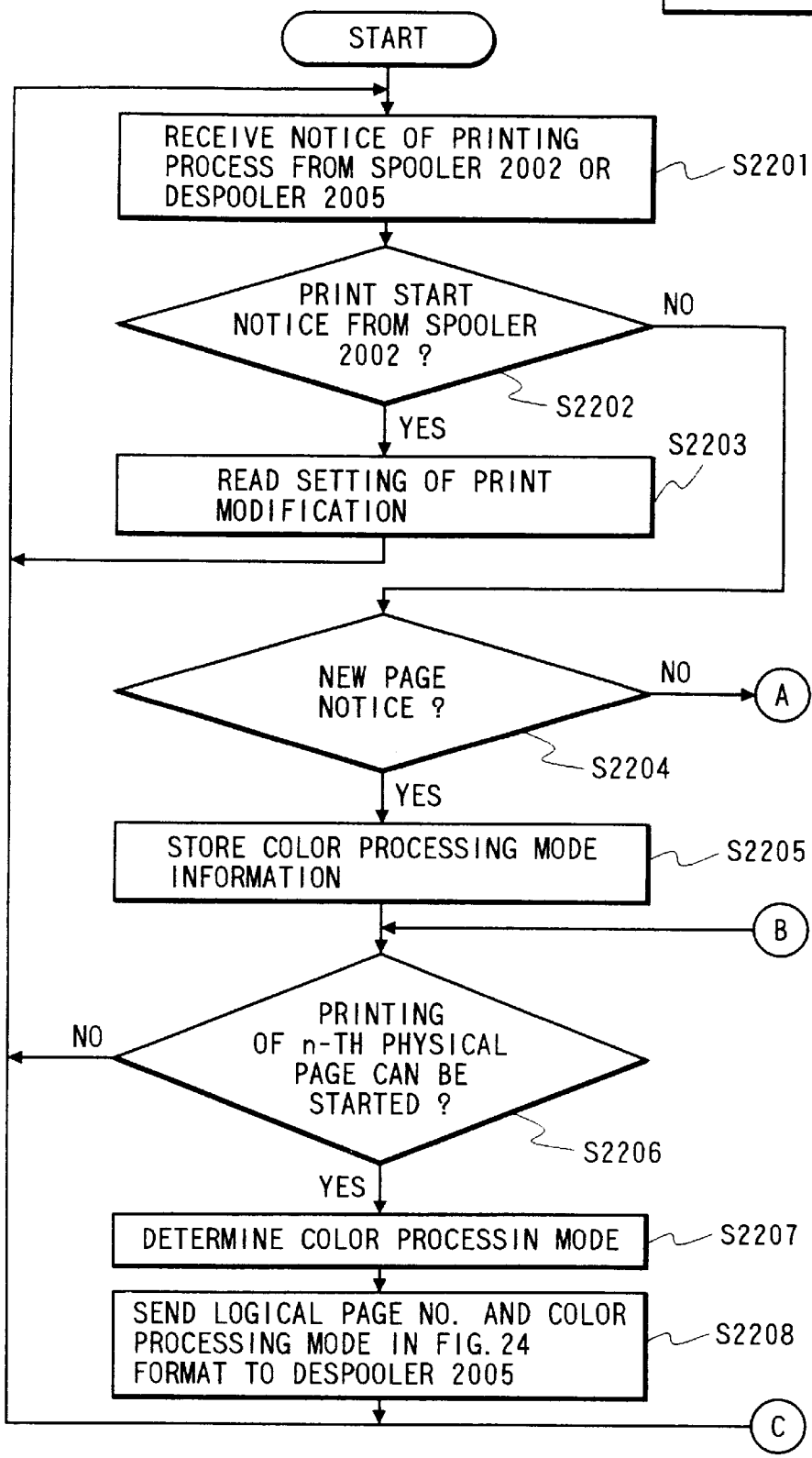
FIG. 22 is comprised of FIGS. 22A and 22B illustrating flowcharts showing a print control and a decision of a color processing mode in a spool file manager.
Figure 22B:
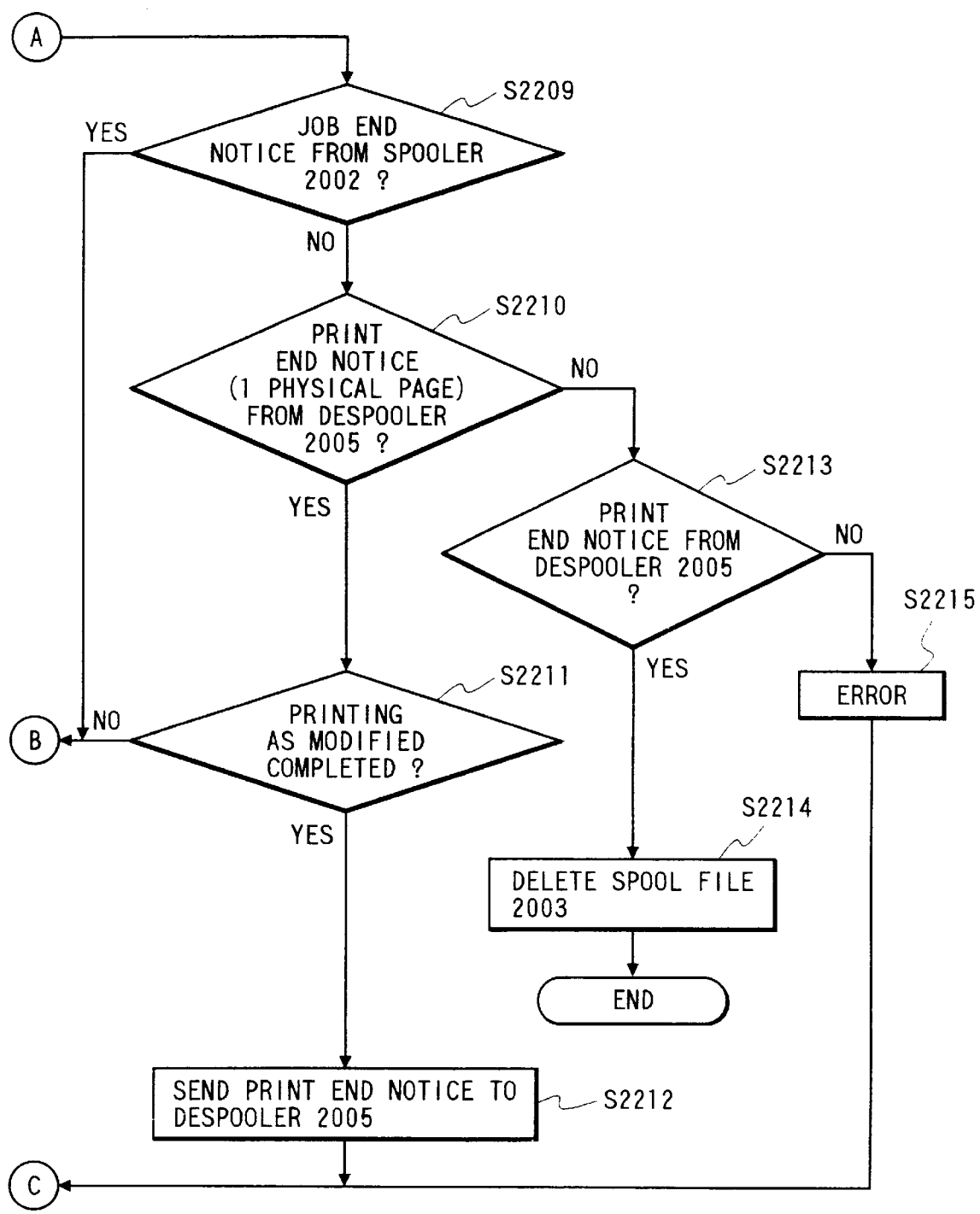

The second embodiment relates to a construction in the system of the first embodiment. FIG. 22 is a flowchart showing the details of a control between the process to generate the spool file 2003 in the spool file manager 2004 and a process to form the print data, which will be explained hereinlater.

In step 2201, a notification of the progress of the printing process from the spooler 2002 or despooler 2005 is received.

In step 2202, a check is made to see if the progress notification is a print start notification from the spooler 2002 which is notified in step 504 in FIG. 5. If YES, step 2203 follows, the relevant spool file is opened from the identifier of the job, the setting of the print modification is read out from the spool file 2003 and the management of the job is started. In step 2202, if the progress notification is not the print start notification from the spooler 2002, step 2204 follows. A check is made to see if the progress notification is a print end notification of one logical page from the spooler 2002 which is notified in step 508 in FIG. 5 mentioned above. If it is the print end notification of one logical page, step 2205 follows and the information of the color processing mode for the logical page is stored.

In step 2206, for the n logical pages in which the spooling was finished at this time point, a check is made to see if the printing of the next n-th physical page to be printed can be started. If YES, step 2207 follows and the color processing mode of each logical page that is assigned to one physical page to be printed is referred from the table in which the color processing modes have previously been stored, thereby deciding the color processing mode. In the embodiment as well, if even one logical page having the color attribute of full color exists in the same physical page, the color processing mode of such a physical page is set to full color.

In step 2208, the numbers of the logical pages constructing the physical page which is in the printable state and the information such as a color processing mode or the like which is used when printing the physical page are notified to the despooler 2005.

After that, the processing routine is returned to step 2201 and the apparatus waits for the next notification.

In the embodiment, the printing process can be performed even if the spooling of all of the print jobs is not finished at the time point when the print data of one page, namely, logic pages constructing one physical page is spooled.

On the other hand, in step 2204, when the progress notification is not the print end notification of one logic page from the spooler 2002, step 2209 follows. A check is made to see if the progress notification is the job end notification from the spooler 2002 that is notified in step 512 in FIG. 5 mentioned above. If YES, step 2206 follows.

On the other hand, when it is not the job end notification, step 2201 follows and a check is made to see if the received notification is the print end notification of one physical page from the despooler 2005. When it is the print end notification of one physical page, step 2211 follows. A check is made to see if the printing of the setting of modification has been finished. If YES, step 2212 follows and the end of printing is notified to the despooler 2005.

On the other hand, if it is decided that the printing of the setting of modification is not finished, step 2206 follows. In the despooler 2005 in the embodiment, the number of physical pages at which the printing processes can be simultaneously performed is presumed to be 1.

In step 2210, when it is decided that the received notification is not the print end notification of one physical page from the despooler 2005, step 2213 follows and a check is made to see if it is the print end notification from the despooler 2005. When it is decided that the received notification is the print end notification from the despooler 2005, step 2214 follows, the spool file 2003 is deleted, and the processing routine is finished.

When the notification is not the print end notification from the despooler 2005, step 2215 follows and an error process is executed. The apparatus waits for the next notification.

Figure 23:
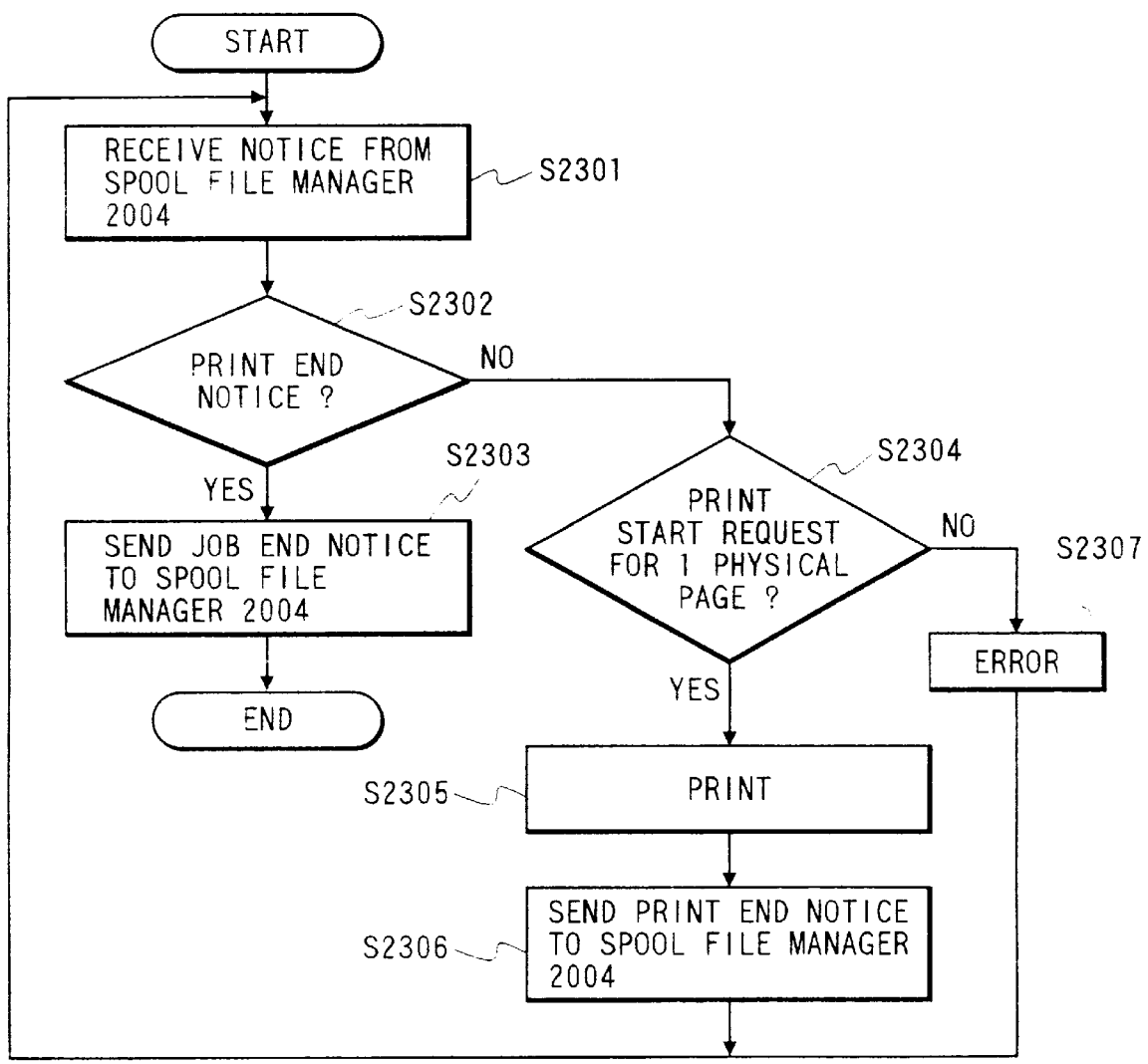
FIG. 23 is a flowchart showing processes in a despooler.

FIG. 23 is a flowchart showing the details of the print data forming process in the despooler 2005.

In response to the print request from the spool file manager 2004, the despooler 2005 reads out the necessary information from the spool file 2003 and forms the print data. The method of transferring the formed print data to the printer is as described in FIG. 20.

In the formation of the print data, first in step 2301, the notification from the spool file manager 2004 mentioned above is inputted. In step 2302, a check is made to see if the inputted notification is the job end notification. If YES, step 2303 follows and the message of the processing end of the despooler 2005 is notified to the spool file manager 2004. The processes are finished.

When the received notification is not the job end notification in step 2302, step 2304 follows and a check is made to see if the print start request of one physical page in step 2208 mentioned above has been notified. When it is determined that it is the print start request of one physical page, step 2305 follows. The information necessary to form the print data of the designated physical page is read and the printing process is executed by the information shown in FIG. 24 sent from the spool file manager 2004 and the spool file 2003. In the printing process, the print request command stored in the spool file 2003 is converted by the despooler 2005 into a format which can be recognized by the graphic engine 1902 and is transferred. The setting of modification such as to lay out a plurality of logical pages into one physical page is converted in this step in consideration of a reduction arrangement.

FIG. 10 shows an example of the decision of the color processing mode in the physical page. For example, in the case where the modification setting is a setting such as to arrange four logical pages into one physical page, the color processing mode of the first physical page is determined at the time point when the fourth logical page is spooled, and the first physical page enters a printable state.

Subsequently, the second physical page enters a printable state at the time point when the eighth logical page is spooled. As shown in FIG. 10, even if the number of logical pages is not a multiple of the number of logical pages which are laid out in one physical page, the logical pages to be arranged in one physical page can be decided by the spool end notification in step 512 in FIG. 5.

If the necessary printing process is finished, in step 2306, the end of the formation of the print data of one physical page is notified to the spool file manager 2004. The processing routine is returned to step 2301 and the apparatus waits for the next notification.

When it is not determined in step 2304 that the received request is the start request or when the received notification is a notification to the other job identifier, step 2307 follows and the other ordinary process or error process is executed. The processing routine is returned to step 2301 and the apparatus waits for the next notification.

As mentioned above, in the second embodiment, the color processing mode of every logical page from the spooler 2002 is stored in the spool file manager 2004 and the color processing mode of the print data is determined by the physical page unit. In the despooler 2005, the printing process is executed in the color processing mode designated at each physical page. Thus, since the color processing mode can be changed every page in the printer, the toner quantity can be reduced and the print throughput can be raised.

Further, even during the spooling of the intermediate code, if the spooling of the data of the physical page was finished and the printing process can be performed, the intermediate code of the printable physical page is despooled and is converted into the output data such as a page description language or the like by the printer driver and is outputted. Therefore, an excellent effect such that the first printing time can be reduced is obtained.

The present invention is not limited to the above embodiments and various changes and modifications can be made within the spirit and scope of the present invention. Therefore, to apprise the public of the scope of the present invention, the following claims are made.

What is claimed is:

1. An information processing apparatus comprising:
   intermediate data generating means for receiving print commands generated by an application via drawing means of OS and for generating intermediate data based on the received print commands and temporarily storing the generated intermediate data;
   color processing mode deciding means for deciding a color processing mode of print data on the basis of the intermediate data generated by said intermediate data generating means;
   print command generating means for generating print commands which include designation of the color processing mode decided by said color processing mode deciding means and for outputting the generated print commands to the drawing means of OS; and
   print data generating means for receiving the print commands generated by said print command generating means via the drawing means of OS and generating print data on the basis of the received print commands.

2. An apparatus according to claim 1, further comprising transmission means for transmitting output data formed on the basis of the print data to a printing apparatus, wherein said color processing mode deciding means decides the color processing mode by a page unit of the print data, and said transmission means transmits the output data by a page unit to the printing apparatus.

3. An apparatus according to claim 1, further comprising page synthesizing means for reducing a plurality of pages of the print data and laying out into one page,
   and wherein said color processing mode deciding means decides the color processing mode in which the page synthesized by said page synthesizing means is correctly color reproduced on the basis of the information of the color processing mode of each page which is laid out to said plurality of pages stored in said color attribute storing means.

4. An apparatus according to claim 3, wherein said color processing mode deciding means decides the color processing mode at a time point when intermediate files as many as the number of pages of the print data of a minimum unit at which the color processing mode in said printing apparatus can be switched are formed.

5. An apparatus according to claim 3, wherein if the color processing mode is decided by a page unit of the print data, said color processing mode deciding means immediately designates the color processing mode of the print data decided by said color processing mode deciding means by the page unit, forms output data to be transmitted to said printing apparatus, and transfers to said printing apparatus.

6. An apparatus according to claim 1, wherein said color processing mode deciding means selects a mode which guarantees color reproducibility in all of pages at each print page on the basis of the color processing module and decides the color processing mode so as to minimize a time that is required from a start to an end of a printing.

7. An apparatus according to claim 1, wherein said control information is a command showing the color attribute of the print data.

8. A print system having an information processing apparatus and a printing apparatus, wherein
   said information processing apparatus comprises:
   intermediate data generating means for receiving print commands generated by an application via drawing means of OS and for generating intermediate data based on the received print commands and temporarily storing the generated intermediate data;

color processing mode deciding means for deciding a color processing mode of print data on the basis of the intermediate data generated by said intermediate data generating means;

print command generating means for generating print commands which include designation of the color processing mode decided by said color processing mode decided means and for outputting the generated print commands to the drawing means of OS; and print data generation means for receiving the print commands generated by said print command generating means via the drawing means of OS and generating print data on the basis of the received print commands, and said printing apparatus comprises;

receiving means for receiving output data formed on the basis of the print data from said information processing apparatus and the color processing mode decided on the basis of control information included in said print data; and switching means for switching the color processing mode on the basis of the color processing mode received by said receiving means.

9. A system according to claim 8, further comprising transmission means for transmitting output data formed on the basis of the print data to a printing apparatus, wherein said color processing mode deciding means decides the color processing mode by a page unit of the print data, said transmission means transmits the output data by a page unit to the printing apparatus, and said switching means can switch the color processing mode by the page unit of the print data.

10. A system according to claim 8, wherein said control information is a command showing the color attribute of the print data.

11. A system according to claim 8, wherein said print system is a network printer system.

12. A printer color processing mode automatic control method comprising:

an intermediate data generating step of receiving print commands generated by an application via drawing means of OS and for generating intermediate data based on the received print commands and temporarily storing the generated intermediate data;

a color processing mode deciding step of deciding a color processing mode on the basis of the intermediate data generated by said intermediate data generating step;

a print command generating step of generating print command which include designation of the color processing mode decided by said color processing mode deciding step and for outputting the generated print commands to the drawing step of OS; and a print data generating step of receiving the print commands generated by said print command generating step via the drawing means of OS and generating print data on the basis of the received print commands.

13. A method according to claim 12, further comprising a transmission step of transmitting output data formed on the basis of the print data to a printing apparatus, wherein in said color processing mode deciding step, the color processing mode is decided by a page unit of the print data, and in said transmission step the output data is transmitted by a page unit to the printing apparatus.

14. A method according to claim 13, wherein when the output data which is transmitted to said printing apparatus is formed from data of an intermediate code format which was temporarily saved, in said transfer step, the color processing mode of the page of each print data decided by said color processing mode deciding step is designated and the output data which is transmitted to said printing apparatus is formed and transferred to said printing apparatus.

15. A method according to claim 12, further comprising a page synthesizing step of reducing a plurality of pages of the print data and laying out into one page, and wherein in said color processing mode deciding step, the color processing mode in which the page synthesized by said page synthesizing step is correctly color reproduced is decided on the basis of the information of the color processing mode of each page which is laid out to said plurality of pages stored in said color attribute storing step.

16. A method according to claim 15, wherein in said color processing mode deciding step, the color processing mode can be decided at a time point when intermediate files as many as the number of pages of the print data of a minimum unit at which the color processing mode in said printing apparatus can be switched are formed.

17. A method according to claim 15, wherein if the color processing mode is decided by a page unit of the print data, in said color processing mode deciding step, the color processing mode of the print data decided by said color processing mode deciding step is immediately designated by the page unit and output data to be transmitted to said printing apparatus is formed and can be transferred to said printing apparatus.

18. A method according to claim 12, wherein in said color processing mode deciding step, a mode which guarantees color reproducibility in all of pages is selected at each print page on the basis of the color processing mode and the color processing mode is decided so as to minimize a time that is required from a start to an end of a printing.

19. A method according to claim 12, wherein said control information is a command showing the color attribute of the print data.

20. A print system control method having an information processing apparatus and a printing apparatus, comprising:

an intermediate data generating step of receiving print commands generated by an application via drawing means of OS and for generating intermediate data based on the received print commands and temporarily storing the generated intermediate data;

a color processing mode deciding step of deciding a color processing mode on the basis of the intermediate data generated by said intermediate data generating step;

a print command generating step of generating print commands which include designation of the color processing mode decided by said color processing mode deciding step and for outputting the generated print commands to the drawing step of OS;

a print data generating step of receiving the print commands generated by said print command generating means via the drawing means of OS and generating print data on the basis of the received print commands;

a receiving step of receiving the output data from said information processing apparatus and the color processing mode decided on the basis of the control information included in the print data; and a switching step of switching the color processing mode on the basis of the color processing mode received by said receiving step.

21. A method according to claim 20, further comprising a transmission step of transmitting output data formed on the basis of the print data to a printing apparatus, wherein in said color processing mode deciding step, the color processing mode is decided by a page unit of the print data, in said transmission step and the output data is transmitted by a page unit to said printing apparatus, and in said switching step, the color processing mode can be switched by the page unit of the print data.

22. A storing medium in which a program comprises:
an intermediate data generating step of receiving print commands generated by an application via drawing means of OS and for generating intermediate data based on the received print commands and temporarily storing the generated intermediate data;
a color processing mode deciding step of deciding a color processing mode on the basis of the intermediate data generated by said intermediate data generating step;
a print command generating step of generating print commands which include designation of the color processing mode decided by said color processing mode deciding step and for outputting the generated print commands to the drawing step of OS; and
a print data generating step of receiving the print commands generated by said print command generating step via the drawing means of OS and generating print data on the basis of the received print commands.

23. A storing medium in which a program comprises:
an intermediate data generating step of receiving print commands generated by an application via drawing means of OS and for generating intermediate data based on the received print commands and temporarily storing the generated intermediate data;
a color processing mode deciding step of deciding a color processing mode on the basis of the intermediate data generated by said intermediate data generating means;
a print command generating step of generating print commands which include designation of the color processing mode decided by said color processing mode deciding step and for outputting the generated print commands to the drawing step of OS;
a print data generating step of receiving the print commands generated by said print command generating means via the drawing means of OS and generating print data on the basis of the received print commands;
a receiving step of receiving the output data from said information processing apparatus and the color processing mode decided on the basis of the control information included in the print data, and
a switching step of switching the color processing mode on the basis of the color processing mode received by said receiving step.

24. A storing medium according to claim 22, further comprising a transmission step of transmitting output data formed on the basis of the print data to a printing apparatus, wherein said color processing mode deciding step decides the color processing mode by a page unit of the print data, and said transmission step transmits the output data by page unit to the printing apparatus.

25. A storing medium according to claim 24, further comprising a page synthesizing step of reducing a plurality of pages of the print data and laying out into one page,
and wherein in said color processing mode deciding step, the color processing mode in which the page synthesized by said page synthesizing step is correctly color reproduced is decided on the basis of the information of the color processing mode of each page which is laid out to said plurality of a pages stored ins said color attribute storing step.

26. A storing medium according to claim 25, wherein in said color processing mode deciding step, the color processing mode can be decided at a time point when intermediate files as many as the number of a pages of the print data of a minimum unit at which the color processing mode in said printing apparatus can be switched are formed.

27. A storing medium according to claim 25, wherein if the color processing mode is decided by a page unit of the print data, in said color processing mode deciding step, the color processing mode of the print data decided by said color processing mode deciding step is immediately designated by the page unit and output data to be transmitted to said printing apparatus is formed and can be transferred to said printing apparatus.

28. A storing medium according to claim 24, wherein in said color processing mode deciding step, a mode which guarantees color reproducibility in all of pages is selected at each print page on the basis of the color processing mode and the color processing mode is decided so as to minimize a time that is required from a start to an end of a printing.

29. A storing medium according to claim 24, wherein said control information is a command showing the color attribute of the print data.

30. A computer program for performing an information processing method comprising:
an intermediate data generating step of receiving print commands generated by an application via drawing means of OS and for generating intermediate data based on the received print commands and temporarily storing the generated intermediate data;
a color processing mode deciding step of deciding a color processing mode on the basis of the intermediate data generated by said intermediate data generating step;
a print command generating step of generating print commands which include designation of the color processing mode decided by said color processing mode deciding step and for outputting the generated print commands to the drawing step of OS; and
a print data generating step of receiving the print commands generated by said print command generating step via the drawing means of OS and generating print data on the basis of the received print commands.

31. A computer program according to claim 30, further comprising a transmission step of transmitting output data formed on the basis of the print data to a printing apparatus, wherein said color processing mode deciding step decides the color processing mode by a page unit of the print data, and said transmission step transmits the output data by page unit to the printing apparatus.

32. A computer program according to claim 31 further comprising a page synthesizing step of reducing a plurality of pages of the print data and laying out into one page,
and wherein in said color processing mode deciding step, the color processing mode in which the page synthesized by said page synthesizing step is correctly color reproduced is decided on the basis of the information of the color processing mode of each page which is laid out to said plurality of a pages stored ins said color attribute storing step.

33. A computer program according to claim 32, wherein in said color processing mode deciding step, the color processing mode can be decided at a time point when intermediate files as many as the number of a pages of the print data of a minimum unit at which the color processing mode in said printing apparatus can be switched are formed.

34. A computer program according to claim 32, wherein if the color processing mode is decided by a page unit of the print data, in said color processing mode deciding step, the color processing mode of the print data decided by said color processing mode deciding step is immediately designated by the page unit and output data to be transmitted to said printing apparatus is formed and can be transferred to said printing apparatus.

35. A computer program according to claim 31, wherein in said color processing mode deciding step, a mode which guarantees color reproducibility in all of pages is selected at each print page on the basis of the color processing mode and the color processing mode is decided so as to minimize a time that is required from a start to an end of a printing.

36. A computer program according to claim 31, wherein said control information is a command showing the color attribute of the print data.

37. An information processing apparatus comprising:
   page synthesizing means for receiving print commands generated by an application and for reducing a plurality of pages of the print commands into one page;
   color processing mode deciding means for deciding a color processing mode of print data on the basis of the plurality of pages of the print commands reduced by said page synthesizing means; and
   print data generating means for generating print data on the basis of the print commands in the color processing mode decided by said color processing mode deciding means,
   wherein said color processing mode deciding means decides the color processing mode in which the page synthesized by said page synthesizing means is correctly color reproduced, on the basis of information on the color processing mode for each of the plurality of pages.

38. An apparatus according to claim 37, further comprising:
   intermediate data generating means for receiving the print commands generated by the application via drawing means of OS and for generating intermediate data based on the received print commands and temporarily storing the generated intermediate data; and
   print command generating means for generating print commands which include designation of the color processing mode decided by said color processing mode deciding means and for outputting the generated print commands to the drawing means of OS.

39. An apparatus according to claim 37, further comprising transmission means for transmitting output data formed on the basis of the print data to a printing apparatus, wherein said color processing mode deciding means decides the color processing mode by a page unit of the print data, and said transmission means transmits the output data by a page unit to the printing apparatus.

40. An apparatus according to claim 37, wherein said color processing mode deciding means decides the color processing mode at a time point when intermediate files as many as the number of pages of the print data of a minimum unit at which the color processing mode in said printing apparatus can be switched are formed.

41. An apparatus according to claim 37, wherein if the color processing mode is decided by a page unit of the print data, said color processing mode deciding means immediately designates the color processing mode of the print data decided by said color processing mode deciding means by the page unit, forms output data to be transmitted to said printing apparatus, and transfers to said printing apparatus.

42. An apparatus according to claim 37, wherein said color processing mode deciding means selects a mode which guarantees color reproducibility in all of pages at each print page on the basis of the color processing module and decides the color processing mode so as to minimize a time that is required from a start to an end of a printing.

43. An apparatus according to claim 37, wherein said control information is a command showing the color attribute of the print data.

44. An information processing method comprising:
   a page synthesizing step of receiving print commands generated by an application and for reducing a plurality of pages of the print commands into one page for layout on one page;
   a color processing mode deciding step of deciding a color processing mode of print data on the basis of the plurality of pages of the print commands reduced by said page synthesizing step; and
   a print data generating step of generation print data on the basis of the print commands in the color processing mode decided by said color processing mode deciding step,
   wherein said color processing mode deciding step decides the color processing mode in which the page synthesized by said page synthesizing step is correctly color reproduced, on the basis of information on the color processing mode for each of the plurality of pages.

45. A method according to claim 44, further comprising:
   an intermediate data generating step of receiving the print commands generated by the application via a drawing step of OS an for generating intermediate data based on the received print commands and temporarily storing the generated intermediate data; and
   a print command generating step of generating print commands which include designation of the color processing mode decided by said color processing mode deciding step and for outputting the generated print commands to the drawing step of OS.

46. A method according to claim 44, further comprising a transmission step of transmitting output data formed on the basis of the print data to a printing apparatus, wherein said color processing mode deciding step decides the color processing mode by a page unit of the print data, and said transmission step transmits the output data by a page unit to the printing apparatus.

47. A method according to claim 44, wherein said color processing mode deciding step decides the color processing mode at a time point when intermediate files as many as the number of pages of the print data of a minimum unit at which the color processing mode in said printing apparatus can be switched are formed.

48. A method according to claim 44, wherein if the color processing mode is decided by a page unit of the print data, said color processing mode deciding step immediately designates the color processing mode of the print data decided by said color processing mode deciding step by the page unit, forms output data to be transmitted to said printing apparatus, and transfers to said printing apparatus.

49. A method according to claim 44, wherein said color processing mode deciding step selects a mode which guarantees color reproducibility in all of pages at each print page on the basis of the color processing module and decides the color processing mode so as to minimize a time that is required from a start to an end of a printing.

50. A method according to claim 44, wherein said control information is a command showing the color attribute of the print data.

51. A computer readable medium having recorded thereon codes for implementing a computer implementable information processing method comprising:
- a page synthesizing step of receiving print commands generated by an application and for reducing a plurality of pages of the print commands into one page for layout on one page;
- a color processing mode deciding step of deciding a color processing mode of print data on the basis of the plurality of pages of the print commands reduced by said page synthesizing step; and
- a print data generating step of generating print data on the basis of the print commands in the color processing mode decided by said color processing mode deciding step,
- wherein said color processing mode deciding step decides the color processing mode in which the page synthesized by said page synthesizing step is correctly color reproduced, on the basis of information on the color processing mode for each of the plurality of pages.

52. A computer readable medium according to claim 51, further comprising:
- an intermediate data generating step of receiving the print commands generated by the application via drawing means of OS and for generating intermediate data based on the received print commands and temporarily storing the generated intermediate data; and
- a print command generating step of generating print commands which include designation of the color processing mode decided by said color processing mode deciding step and for outputting the generated print commands to the drawing step of Os.

53. A computer readable medium according to claim 51, further comprising a transmission step of transmitting output data formed on the basis of the print data to a printing apparatus, wherein said color processing mode deciding step decides the color processing mode by a page unit of the print data, and said transmission step transmits the output data by a page unit to the printing apparatus.

54. A computer readable medium according to claim 51, wherein said color processing mode deciding step decides the color processing mode at a time point when intermediate files as many as the number of pages of the print data of a minimum unit at which the color processing mode in said printing apparatus can be switched are formed.

55. A computer readable medium according to claim 51, wherein if the color processing mode is decided by a page unit of the print data, said color processing mode deciding step immediately designates the color processing mode of the print data decided by said color processing mode deciding step by the page unit, forms output data to be transmitted to said printing apparatus, and transfers to said printing apparatus.

56. A computer readable medium according to claim 51, wherein said color processing mode deciding step selects a mode which guarantees color reproducibility in all of pages at each print page on the basis of the color processing module and decides the color processing mode so as to minimize a time that is required from a start to an end of a printing.

57. A computer readable medium according to claim 51, wherein said control information is a command showing the color attribute of the print data.

58. A computer program for performing an information processing method comprising:
- a page synthesizing step of receiving print commands generated by an application and for reducing a plurality of pages of the print commands into one page for layout on one page;
- a color processing mode deciding step of deciding a color processing mode of print data on the basis of the plurality of pages of the print commands reduced by said page synthesizing step; and
- a print data generating step of generation print data on the basis of the print commands in the color processing mode decided by said color processing mode deciding step,
- wherein said color processing mode deciding step decides the color processing mode in which the page synthesized by said page synthesizing step is correctly color reproduced, on the basis of information on the color processing mode for each of the plurality of pages.

59. A computer program according to claim 58, further comprising:
- an intermediate data generating step of receiving the print commands generated by the application via a drawing step of OS an for generating intermediate data based on the received print commands and temporarily storing the generated intermediate data; and
- a print command generating step of generating print commands which include designation of the color processing mode decided by said color processing mode deciding step and for outputting the generated print commands to the drawing step of OS.

60. A computer program according to claim 58, further comprising a transmission step of transmitting output data formed on the basis of the print data to a printing apparatus, wherein said color processing mode deciding step decides the color processing mode by a page unit of the print data, and said transmits the output data by a page unit to the printing apparatus.

61. A computer program according to claim 58, wherein said color processing mode deciding step decides the color processing mode at a time point when intermediate files as many as the number of pages of the print data of a minimum unit at which the color processing mode in said printing apparatus can be switched are formed.

62. A computer program according to claim 58, wherein if the color processing mode is decided by a page unit of the print data, said color processing mode deciding step immediately designates the color processing mode of the print data decided by said color processing mode deciding step by the page unit, forms output data to be transmitted to said printing apparatus, and transfers to said printing apparatus.

63. A computer program according to claim 58, wherein said color processing mode deciding step selects a mode which guarantees color reproducibility in all of pages at each print page on the basis of the color processing module and decides the color processing mode so as to minimize a time that is required from a start to an end of a printing.

64. A computer program according to claim 58, wherein said control information is a command showing the color attribute of the print data.

65. An information processing system comprising:
- page synthesizing means for receiving print commands generated by an application and for reducing a plurality of pages of the print commands into one page for layout on one page;
- color processing mode deciding means for deciding a color processing mode of print data on the basis of the plurality of pages of the print commands reduced by said page synthesizing means;
- print data generating means for generating print data on the basis of the print commands in the color processing mode decided by said color processing mode deciding means; and a printer for printing the generated print data on a print medium, wherein said color processing mode deciding means decides the color processing mode in which the page synthesized by said page synthesizing means is correctly color reproduced, on the basis of information on the color processing mode for each of the plurality of pages.

66. An information processing apparatus comprising:

analysis means for analyzing print command generated by an application and for determining a color attribute for each page;

color processing mode deciding means for deciding a color processing mode of print data on the basis of a print processing in a printing apparatus and on the basis of the color attribute for each page determined by said analysis means; and print data generating means for generating print data on the basis of the print commands in the color processing mode decided by said color processing mode deciding means, wherein said color processing mode deciding means decides the color processing mode suitable for the print processing in the printing apparatus.

67. An apparatus according to claim 66, wherein said color processing mode deciding means changes the color processing mode if the same color attribute continues for at least two consecutive pages and sets the color processing mode as a color mode if the color attribute changes page by page.

68. An apparatus according to claim 67, further comprising:

intermediate data generating means for receiving the print commands generated by the application via drawing means of OS and for generating intermediate data based on the received print commands and temporarily storing the generated intermediate data; and print command generating means for generating print commands which include designation of the color processing mode decided by said color processing mode deciding means and for outputting the generated print commands to the drawing means of OS.

69. An apparatus according to claim 68, further comprising page synthesizing means for reducing a plurality of pages of the print data and laying out into one page, and wherein said color processing mode deciding means decides the color processing mode in which the page synthesized by said page synthesizing means is correctly color reproduced on the basis of the information of the color processing mode of each page which is laid out to said plurality of pages stored in said color attribute storing means.

70. An apparatus according to claim 69, wherein said color processing mode deciding means decides the color processing mode at a time point when intermediate files as many as the number of pages of the print data of a minimum unit at which the color processing mode in said printing apparatus can be switched are formed.

71. An apparatus according to claim 69, wherein if the color processing mode is decided by a page unit of the print data, said color processing mode deciding means immediately designates the color processing mode of the print data decided by said color processing mode deciding means by the page unit, forms output data to be transmitted to said printing apparatus, and transfers to said printing apparatus.

72. An apparatus according to claim 68, wherein said color processing mode deciding means selects a mode which guarantees color reproducibility in all of pages at each print page on the basis of the color processing module and decides the color processing mode so as to minimize a time that is required from a start to an end of a printing.

73. An apparatus according to claim 66, wherein said analysis means analyzes the print command showing the color attribute for one page.

74. An information processing method comprising:

an analysis step of analyzing print command generated by an application and for determining a color attribute for each page;

a color processing mode deciding step of deciding a color processing mode of print data on the basis of a print processing in a printing apparatus and on the basis of the color attribute for each page determined by said analysis step; and a print data generating step of generating print data on the basis of the print commands in the color processing mode decided by said color processing mode deciding step, wherein said color processing mode deciding step decides the color processing mode suitable for the print processing in the printing apparatus.

75. A method according to claim 74, wherein said color processing mode deciding step changes the color processing mode if the same color attribute continues for at least two consecutive pages and sets the color processing mode as a color mode if the color attribute changes page by page.

76. A method according to claim 74, further comprising:

an intermediate data generating step for receiving the print commands generated by the application via a drawing step of OS and for generating intermediate data based on the received print commands and temporarily storing the generated intermediate data; and a print command generating step of generating print commands which include designation of the color processing mode decided by said color processing mode deciding step and for outputting the generated print commands to the drawing step of OS.

77. A method according to claim 74, further comprising a page synthesizing step of reducing a plurality of pages of the print data and laying out into one page, and wherein said color processing mode deciding step decides the color processing mode in which the page synthesized by said page synthesizing step is correctly color reproduced on the basis of the information of the color processing mode of each page which is laid out to said plurality of pages stored in said color attribute storing step.

78. A method according to claim 77, wherein said color processing mode deciding step decides the color processing mode at a time point when intermediate files as many as the number of pages of the print data of a minimum unit at which the color processing mode in said printing apparatus can be switched are formed.

79. A method according to claim 77, wherein if the color processing mode is decided by a page unit of the print data, said color processing mode deciding step immediately designates the color processing mode of the print data decided by said color processing mode deciding step by the page unit, forms output data to be transmitted to said printing apparatus, and transfers to said printing apparatus.

80. A method according to claim 74, wherein said color processing mode deciding step selects a mode which guarantees color reproducibility in all of pages at each print page on the basis of the color processing module and decides the color processing mode so as to minimize a time that is required from a start to an end of a printing.

81. A method according to claim 74, wherein said analysis step analyzes the print command showing the color attribute or one page.

82. A computer readable medium having recorded thereon codes for implementing a computer implementable information processing method comprising:

an analysis step of analyzing print command generated by an application and for determining a color attribute for each page;

a color processing mode deciding step of deciding a color processing mode of print data on the basis of a print processing in a printing apparatus and on the basis of the color attribute for each page determined by said analysis step; and a print data generating step of generating print data on the basis of the print commands in the color processing mode decided by said color processing mode deciding step, wherein said color processing mode deciding step decides the color processing mode suitable for the print processing in the printing apparatus.

83. A computer readable medium according to claim 82, wherein said color processing mode deciding step changes the color processing mode if the same color attribute continues for at least two consecutive pages and sets the color processing mode as a color mode if the color attribute changes page by page.

84. A computer readable medium apparatus according to claim 82, further comprising:

an intermediate data generating step of receiving the print commands generated by the application via a drawing step of OS and for generating intermediate data based on the received print commands and temporarily storing the generated intermediate data; and a print command generating step of generating print commands which include designation of the color processing mode decided by said color processing mode deciding step and for outputting the generated print commands to the drawing step of OS.

85. A computer readable medium according to claim 82, further comprising a page synthesizing step of reducing a plurality of pages of the print data and laying out into one page, and wherein said color processing mode deciding step decides the color processing mode in which the page synthesized by said page synthesizing step is correctly color reproduced on the basis of the information of the color processing mode of each page which is laid out to said plurality of pages stored in said color attribute storing step.

86. A computer readable medium according to claim 85, wherein said color processing mode deciding step decides the color processing mode at a time point when intermediate files as many as the number of pages of the print data of a minimum unit at which the color processing mode in said printing method can be switched are formed.

87. A computer readable medium according to claim 85, wherein if the color processing mode is decided by a page unit of the print data, said color processing mode deciding step immediately designates the color processing mode of the print data decided by said color processing mode deciding step by the page unit, forms output data to be transmitted to said printing apparatus, and transfers to said printing apparatus.

88. A computer readable medium according to claim 82, wherein said color processing mode deciding step selects a mode which guarantees color reproducibility in all of pages at each print page on the basis of the color processing module and decides the color processing mode so as to minimize a time that is required from a start to an end of a printing.

89. A computer readable medium according to claim 82, wherein said analysis step analyzes the print command showing the color attribute for one page.

90. A computer program for performing an information processing method comprising:

an analysis step of analyzing print command generated by an application and for determining a color attribute for each page;

a color processing mode deciding step of deciding a color processing mode of print data on the basis of a print processing in a printing apparatus and on the basis of the color attribute for each page determined by said analysis step; and a print data generating step of generating print data on the basis of the print commands in the color processing mode decided by said color processing mode deciding step, wherein said color processing mode deciding step decides the color processing mode suitable for the print processing in the printing apparatus.

91. A computer program according to claim 90, wherein said color processing mode deciding step changes the color processing mode if the same color attribute continues for at least two consecutive pages and sets the color processing mode as a color mode if the color attribute changes page by page.

92. A computer program according to claim 90, further comprising:

an intermediate data generating step of receiving the print commands generated by the application via a drawing step of OS and for generating intermediate data based on the received print commands and temporarily storing the generated intermediate data; and a print command generating step of generating print commands which include designation of the color processing mode decided by said color processing mode deciding step and for outputting the generated print commands to the drawing step of OS.

93. A computer program according to claim 90, further comprising a page synthesizing step of reducing a plurality of pages of the print data and laying out into one page, and wherein said color processing mode deciding step decides the color processing mode in which the page synthesized by said page synthesizing step is correctly color reproduced on the basis of the information of the color processing mode of each page which is laid out to said plurality of pages stored in said color attribute storing step.

94. A computer program according to claim 93, wherein said color processing mode deciding step decides the color processing mode at a time point when intermediate files as many as the number of pages of the print data of a minimum unit at which the color processing mode in said printing apparatus can be switched are formed.

95. A computer program according to claim 93, wherein if the color processing mode is decided by a page unit of the print data, said color processing mode deciding step immediately designates the color processing mode of the print data decided by said color processing mode deciding step by the page unit, forms output data to be transmitted to said printing apparatus, and transfers to said printing apparatus.

96. A computer program according to claim 90, wherein said color processing mode deciding step selects a mode which guarantees color reproducibility in all of pages at each print page on the basis of the color processing module and decides the color processing mode so as to minimize a time that is required from a start to an end of a printing.

97. A computer program according to claim 90, wherein said analysis step analyzes the print command showing the color attribute for one page.

98. An information processing system comprising:

analysis means for analyzing print commands generated by an application and for determining a color attribute for each page;

color processing mode deciding means for deciding a color processing mode of print data on the basis of a print processing in a printing apparatus and on the basis of the color attribute for each page determined by said analysis means;

print data generating means for generating print data on the basis of the print commands in the color processing mode decided by said color processing mode deciding means; and a printer for printing the generated print data on a print medium, wherein said color processing mode deciding means decides the color processing mode suitable for the print processing in the printing apparatus.

* * * * *

UNITED STATES PATENT AND TRADEMARK OFFICE
CERTIFICATE OF CORRECTION

PATENT NO. : 6,120,197
DATED : September 19, 2000
INVENTOR(S) : Hirokazu Kawamoto et al.

It is certified that error appears in the above-identified patent and that said Letters Patent is hereby corrected as shown below:

Column 6,
Line 33, "every" should read -- for every --.

Column 8,
Line 41, "once" should read -- first --.

Column 10,
Line 45, "<ESC>[1'p." should read -- <ESC>[1" p. --.

Column 11,
Line 23, "Just" should read -- just --.

Column 16,
Line 8, "referred" should read -- referred to --.

Column 19,
Line 8, "decided" should read -- deciding --;
Line 15, "comprises;" should read -- comprises: --; and
Line 49, "command" should read -- commands --.

Column 22,
Line 1, "ins" should read -- in --;
Line 5, "a" should be deleted;
Line 60, "ins" should read -- in --; and
Line 65, "a" should be deleted.

Column 23,
Line 67, "transfers" should read -- transfers the output data --.

Column 24,
Line 18, "generation" should read -- generating --;
Line 31, "an" should read -- and --; and
Line 58, "transfers" should read -- transfers the output data --.

UNITED STATES PATENT AND TRADEMARK OFFICE
CERTIFICATE OF CORRECTION

PATENT NO. : 6,120,197
DATED : September 19, 2000
INVENTOR(S) : Hirokazu Kawamoto et al.

It is certified that error appears in the above-identified patent and that said Letters Patent is hereby corrected as shown below:

Column 25,
Line 31, "Os." should read -- OS. --; and
Line 50, "transfers" should read -- transfers the output data --.

Column 26,
Line 17, "an" should read -- and --; and
Line 44, "transfers" should read -- transfers the output data --.

Column 27,
Line 65, "transfers" should read -- transfers the output data --.

Column 28,
Line 63, "transfers" should read -- transfers the output data --.

Column 29,
Line 9, "command" should read -- commands --.

Column 30,
Line 13, "command" should read -- commands --.

Column 31,
Line 3, "transfers" should read -- transfers the output data --.

Signed and Sealed this

Eighteenth Day of December, 2001

*Attest:*

JAMES E. ROGAN
*Attesting Officer*   *Director of the United States Patent and Trademark Office*